United States Patent
Mukai

(10) Patent No.: US 12,107,948 B2
(45) Date of Patent: Oct. 1, 2024

(54) AUTHENTICATION ENCRYPTION DEVICE, AUTHENTICATION DECRYPTION DEVICE, AUTHENTICATION ENCRYPTION METHOD, AUTHENTICATION DECRYPTION METHOD, AND STORAGE MEDIUM

(71) Applicant: NEC Corporation, Tokyo (JP)

(72) Inventor: Akiko Mukai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 17/800,403

(22) PCT Filed: Feb. 28, 2020

(86) PCT No.: PCT/JP2020/008255
§ 371 (c)(1),
(2) Date: Aug. 17, 2022

(87) PCT Pub. No.: WO2021/171543
PCT Pub. Date: Sep. 2, 2021

(65) Prior Publication Data
US 2023/0134515 A1    May 4, 2023

(51) Int. Cl.
*H04L 9/06* (2006.01)
*H04L 9/32* (2006.01)

(52) U.S. Cl.
CPC ............ *H04L 9/0637* (2013.01); *H04L 9/32* (2013.01)

(58) Field of Classification Search
CPC ....... H04L 9/0637; H04L 9/32; H04L 9/0894; H04L 9/3242
See application file for complete search history.

(56) References Cited

U.S. PATENT DOCUMENTS

| 5,363,448 A * | 11/1994 | Koopman, Jr. .... G07C 9/00182 713/169 |
|---|---|---|
| 2002/0009123 A1* | 1/2002 | Medlock ................ G06F 7/584 708/252 |

(Continued)

FOREIGN PATENT DOCUMENTS

| WO | 2016/067524 A1 | 6/2016 |
| WO | 2019/163032 A1 | 8/2019 |

OTHER PUBLICATIONS

International Search Report for PCT Application No. PCT/JP2020/008255, mailed on Aug. 25, 2020.

(Continued)

*Primary Examiner* — El Hadji M Sall
(74) *Attorney, Agent, or Firm* — Sughrue Mion, PLLC

(57) ABSTRACT

An authentication encryption device generates a mask sequence having, as an element, multiplication, in a Galois field, of a basic mask and a primitive element raised to power of an exponent. The basic mask is defined based on an initialization vector, a secret key, and a constant. The primitive element is a primitive element of a multiplicative group of the Galois field. The exponent differs per cleartext block. The authentication encryption device generates a mask for tag generation by multiplication, in the Galois field, of the basic mask and the primitive element of the multiplicative group of the Galois field raised to power of an exponent differing from the exponent in any of the element in the mask sequence.

7 Claims, 17 Drawing Sheets

(56) References Cited

U.S. PATENT DOCUMENTS

| | | | |
|---|---|---|---|
| 2004/0090907 A1* | 5/2004 | An | G06F 7/584 370/208 |
| 2016/0173276 A1* | 6/2016 | Minematsu | G09C 1/00 380/28 |
| 2020/0026883 A1* | 1/2020 | de Almeida | H04L 9/0637 |
| 2021/0021406 A1 | 1/2021 | Minematsu | |
| 2021/0399875 A1* | 12/2021 | Inoue | H04L 9/3242 |

OTHER PUBLICATIONS

Robert Granger et al., "Improved Masking for Tweakable Blockciphers with Applications to Authenticated Encryption", Proceedings, Part I, of the 35th Annual International Conference on Advances in Cryptology, EUROCRYPT 2016, vol. 9665, pp. 283-293, 2016.

Phillip Rogaway, "Efficient Instantiations of Tweakable Blockciphers and Refinements to Modes OCB and PMAC" Springer, ASIACRYPT 2004, Lecture Notes in Computer Science, 3329, pp. 6-31, 2004.

Akiko Inoue et al., "Cryptanalysis of OCB2: Attacks on Authenticity and Confidentiality", The International Association for Cryptologic Research (IACR), Cryptology ePrint Archive: Report 2019/311, pp. 1-23, 2019.

* cited by examiner

AUTHENTICATION ENCRYPTION DEVICE, AUTHENTICATION DECRYPTION DEVICE, AUTHENTICATION ENCRYPTION METHOD, AUTHENTICATION DECRYPTION METHOD, AND STORAGE MEDIUM

This application is a National Stage Entry of PCT/JP2020/008255 filed on Feb. 28, 2020, the contents of all of which are incorporated herein by reference, in their entirety.

TECHNICAL FIELD

The present invention relates to an authentication encryption device, an authentication decryption device, an authentication encryption method, an authentication decryption method, and a recording medium.

BACKGROUND ART

Authenticated encryption is a technique for applying encryption and authentication tag calculation for tampering detection to cleartext messages, using a preliminarily shared secret key. Application of authenticated encryption to a communication path enables contents concealment against eavesdropping and detection of unauthorized tampering, thereby realizing robust protection for communication contents as a result.

Examples of authenticated encryption include OPP disclosed in Non-Patent Document 1, OCB and OCB2 disclosed in Non-Patent Document 2, and OCB2f disclosed in Non-Patent Document 3.

PRIOR ART DOCUMENTS

Non-Patent Documents

Non-Patent Document 1: Robert Granger and three others, "Improved Masking for tweakable Blockciphers with Applications to Authenticated Encryption", Proceedings, Part I, of the 35th Annual International Conference on Advances in Cryptology, EUROCRYPT 2016, Vol. 9665, pp. 263-293, 2016

Non-Patent Document 2: Phillip Rogaway, "Efficient Instantiations of tweakable Blockciphers and Refinements to Modes OCB and PMAC", Springer, ASIACRYPT 2004, Lecture Notes in Computer Science, Vol. 3329, pp. 16-31, 2004

Non-Patent Document 3: Akiko Inoue and three others, "Cryptanalysis of OCB2: Attacks on Authenticity and Confidentiality", The International Association for Cryptologic Research (IACR), Cryptology ePrint Archive: Report 2019/311, 2019

SUMMARY OF THE INVENTION

Problems to be Solved by the Invention

In the authentication encryption method typified by OCB2 mentioned above, it is necessary to prepare a mask called a special mask for tag generation in addition to a mask sequence used for cleartext encryption. In general, there is a problem that it is difficult to define such a special mask. This is because in order to define a special mask by means of the existing technique, it is necessary, in general, to solve a discrete logarithm problem over a Galois field $GF(2^n)$.

In general, solving a discrete logarithm problem over a finite field is difficult, and defining a special mask becomes even more difficult as the input/output length of a primitive becomes greater. For example, in OCB2 disclosed in Non-Patent Document 2, the input/output length of the primitive is n=128, and in Non-Patent Document 2, the discrete logarithm problem is solved in several hours using the Pohlig-Hellman algorithm and the Pollard's ρ method. On the other hand, in Non-Patent Document 1, in order to define a special mask of OPP where n=512 and n=1,024, a PC (Personal Computer) having implemented thereon with a latest algorithm called Function Field Sieve method was operated for several days to solve the discrete logarithm problem.

The reason for the above problem will be described in more detail below. First, consider the case where a primitive element σ is determined and a Galois field $GF(2^n)$ is defined so that the primitive element of the multiplicative group thereof is σ. The primitive element σ may be determined by selecting an element that is most efficient in the encryption/decryption processing, depending on the environment in which the encryption method is implemented. In the case of OCB2, the value of the primitive element σ is 2.

The mask used for cleartext encryption can be set easily. From the viewpoint of security, it is sufficient that masks used for cleartext encryption have different values for each cleartext block index in the same initialization vector. Therefore, where the mask sequence used for encrypting m cleartext blocks is Φ, $Φ=(σ^1·Δ, σ^2·Δ, ..., σ^m·Δ)$. Δ=E(K, N), where N indicates an initialization vector.

On the other hand, as mentioned above, it is generally difficult to define a special mask in the existing technique. In the existing technique, for a reason associated with the security evaluation method, a special mask needs to be different from all mask values that may be used in blocks other than the tag generation block, for the same initialization vector. In addition, the special mask needs to be unique for the number of cleartext blocks. That is to say, in the existing technique, the mask of the mask sequence Φ used for cleartext encryption cannot be used as a special mask.

Therefore, in order to define a special mask, an element other than the primitive element σ is selected from the multiplicative group of $GF(2^n)$. Let the element selected for defining the special mask be referred to as special element λ.

As the method of selecting the special element λ, as with the method of selecting the primitive element σ, an element that enables efficient calculation for the environment in which the encryption method is implemented may be selected. In OCB2 disclosed in Non-Patent Document 2, the value of the special element λ is 3.

Next, in order to define the special mask, the discrete logarithm of the special element λ over $GF(2^n)$ is calculated with respect to the primitive element σ. That is to say, α is calculated such that $σ^α=2$ is true on the multiplicative group of $GF(2^n)$. α may also be expressed as $\log_σ(λ)$.

In the case where the absolute value of $\log_σ(λ)$ is too small for $(2^n-1)/2$, the possibility of the value of the special mask being equal to the mask value used for cleartext encryption is high. Therefore, in the case where the absolute value of $\log_σ(λ)$ is too small for $(2^n-1)/2$, the special element λ is retaken and the discrete logarithm is calculated again. In the case of OCB2 disclosed in Non-Patent Document 2, since the absolute value of $\log_2(3)$ is sufficiently large, the special mask for cleartext having m cleartext blocks can be defined as $2^m·3·4$.

However, as already mentioned, it is generally known that solving a discrete logarithm problem over a finite field is difficult. Therefore, the method of defining a special mask by means of the existing technique has a problem of having a very low scalability.

For example, Non-Patent Document 1 proposes an example of a special element that can be used to define a special mask in the case where n=512 and n=1,024. On the other hand, the result of Non-Patent Document 1 cannot be used when use of a field different from the Galois field defined in Non-Patent Document 1 is desired or when a mask sequence or a special mask is desired to be defined with a different element.

An example object of the present invention is to provide an authentication encryption device, an authentication decryption device, an authentication encryption method, an authentication decryption method, and a recording medium capable of solving the problems mentioned above.

Means for Solving the Problem

According to a first example aspect of the present invention, an authentication encryption device includes: a mask sequence generation unit that generates a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; a tag mask generation unit that generates a mask for tag generation by multiplication, in the Galois field, of the basic mask and the primitive element of the multiplicative group of the Galois field raised to power of an exponent differing from the exponent in any of the element in the mask sequence; a first encryption unit that encrypts, at each of primitive inputting and outputting, cleartext using a tweakable block cipher for computing exclusive OR for which the element in the mask sequence used; a checksum calculation unit that calculates a checksum of the cleartext using the cleartext block; and a second encryption unit that encrypts, at at least inputting among primitive inputting and outputting, the checksum using a tweakable block cipher for computing exclusive OR for which the mask for tag generation is used and generates a tag for authentication.

According to a second example aspect of the present invention, an authentication decryption device includes: a mask sequence generation unit that generates a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; a tag mask generation unit that generates a mask for tag generation by multiplication, in the Galois field, of the basic mask and the primitive element of the multiplicative group of the Galois field raised to power of an exponent differing from the exponent in any of the element in the mask sequence; a decryption unit that decrypts, at each of decryption function inputting and outputting, a cipher block into a cleartext block, using a tweakable block cipher for computing exclusive OR for which the element in the mask sequence is used; a checksum calculation unit that calculates a checksum of cleartext, using the cleartext block; a tag generation unit that encrypts, at at least inputting among encryption function inputting and outputting, the checksum using a tweakable block cipher for computing exclusive OR for which the mask for tag generation is used, and generates a tag for authentication, the encryption function being a reciprocal function of the decryption function; and a tag inspection unit that decides whether to accept or not to accept a result of decryption performed by the decryption unit, by using the tag.

According to a third example aspect of the present invention, an authentication encryption method includes the steps of: generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; generating a mask for tag generation by multiplication, in the Galois field, of the basic mask and the primitive element of the multiplicative group of the Galois field raised to power of an exponent differing from the exponent in any of the element in the mask sequence; encrypting, at each of primitive inputting and outputting, cleartext using a tweakable block cipher for computing exclusive OR for which the element in the mask sequence used; calculating a checksum of the cleartext using the cleartext block; and encrypting, at at least inputting among primitive inputting and outputting, the checksum using a tweakable block cipher for computing exclusive OR for which the mask for tag generation is used and generating a tag for authentication.

According to a fourth example aspect of the present invention, an authentication decryption method includes the steps of: generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; generating a mask for tag generation by multiplication, in the Galois field, of the basic mask and the primitive element of the multiplicative group of the Galois field raised to power of an exponent differing from the exponent in any of the element in the mask sequence; decrypting, at each of decryption function inputting and outputting, a cipher block into a cleartext block, using a tweakable block cipher for computing exclusive OR for which the element in the mask sequence is used; calculating a checksum of cleartext, using the cleartext block; encrypting, at at least inputting among encryption function inputting and outputting, the checksum using a tweakable block cipher for computing exclusive OR for which the mask for tag generation is used, and generating a tag for authentication, the encryption function being a reciprocal function of the decryption function; and deciding whether to accept or not to accept a result of decryption, by using the tag.

According to a fifth example aspect of the present invention, a recording medium stores a program for causing a computer to execute steps of: generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; generating a mask for tag generation by multiplication, in the Galois field, of the basic mask and the primitive element of the multiplicative group of the Galois field raised to power of an exponent differing from the exponent in any of the element in the mask sequence; encrypting, at each of primitive inputting and outputting, cleartext using a tweakable block cipher for computing exclusive OR for which the element in the mask sequence used; calculating a checksum of the cleartext using the cleartext block; and encrypting, at at least inputting among primitive inputting and outputting, the checksum using a tweakable block cipher for computing exclusive OR for which the mask for tag generation is used and generating a tag for authentication.

According to a sixth example aspect of the present invention, a recording medium stores a program for causing a computer to execute steps of: generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block; generating a mask for tag generation by multiplication, in the Galois field, of the basic mask and the primitive element of the multiplicative group of the Galois field raised to power of an exponent differing from the exponent in any of the element in the mask sequence; decrypting, at each of decryption function inputting and outputting, a cipher block into a cleartext block, using a tweakable block cipher for computing exclusive OR for which the element in the mask sequence is used; calculating a checksum of cleartext, using the cleartext block; encrypting, at at least inputting among encryption function inputting and outputting, the checksum using a tweakable block cipher for computing exclusive OR for which the mask for tag generation is used, and generating a tag for authentication, the encryption function being a reciprocal function of the decryption function; and deciding whether to accept or not to accept a result of decryption, by using the tag.

Effect of the Invention

According to the authentication encryption device, the authentication decryption device, the authentication encryption method, the authentication decryption method, and the recording medium mentioned above, it is possible to acquire a special mask that is used to generate an authentication encryption tag without solving a discrete logarithm problem over a finite field.

EXAMPLE EMBODIMENT

Hereinafter, example embodiments of the present invention are described, however, the present invention within the scope of the claims is not limited by the following example embodiments. Furthermore, all the combinations of features described in the example embodiments may not be essential for the solving means of the invention.

First Example Embodiment

In the first example embodiment there is described an example of a case where, in inputting and outputting of a primitive, cleartext is encrypted using a tweakable block cipher for computing exclusive OR with use of a mask, and, in at least the inputting among the inputting and outputting of the primitive, a checksum is encrypted using a tweakable block cipher for computing exclusive OR with use of a mask. In particular, in the first example embodiment there is described an example of a case where, only in the inputting among the inputting and outputting of the primitive, a checksum is encrypted using a tweakable block cipher for computing exclusive OR with use of a mask.

Figure 1:
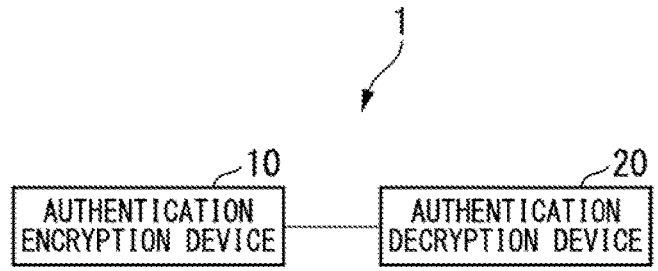
FIG. 1 is a block diagram showing a configuration example of an authentication system according to a first example embodiment.

FIG. 1 is a block diagram showing a configuration example of an authenticated encryption system according to the first example embodiment. As shown in FIG. 1, the authenticated encryption system 1 includes an authentication encryption device 10 and an authentication decryption device 20.

The authenticated encryption system 1 transmits information, using an authenticated encryption. In the authenticated encryption system 1, the authentication encryption device 10 outputs an authenticated encryption. The authentication decryption device 20 acquires and decrypts a ciphertext output by the authentication encryption device 10. The authentication encryption device 10 and the authentication decryption device 20 share a secret key. The secret key shared by the authentication encryption device 10 and the authentication decryption device 20 is expressed as K.

Moreover, the cleartext to be encrypted is referred to as M, and bit sequence data called initialization vector (IV) is introduced. The initialization vector used by the authenticated encryption system 1 is expressed as N. The authentication encryption device 10 generates the initialization vector N. That is to say, the authentication encryption device 10 decides the value of the initialization vector N.

The process performed by the authentication encryption device 10 can be expressed as Equation (1).

[Equation 1]

$$(C,T)=A\text{Enc}_K(N,M) \quad (1)$$

$AEnc_K$ indicates an encryption function of an authenticated encryption with the key K serving as a parameter. C indicates a ciphertext. T indicates bit sequence data for tampering detection called a tag.

The authentication encryption device 10 transmits the initialization vector N, the ciphertext C, and the tag T to the authentication decryption device 20. The data transmitted by the authentication encryption device 10 is expressed as (N, C, T).

Assuming that information received by the authentication decryption device 20 is (N', C', T'), the authentication decryption device 20 calculates $ADec_K(N', C', T')$ as a decoding process. $ADec_K$ indicates a decryption function of an authenticated encryption with the key K serving as a parameter.

If tampering occurs in the middle of communication and (N', C', T')≠(N, C, T) as a result, an error message is output to indicate that $ADec_K(N', C', T')$ has been tampered with. In such a case, the authentication decryption device 20 determines tampering as having occurred and outputs an error message.

If no tampering has occurred and (N', C', T')=(N, C, T), then $ADec_K(N', C', T')=M$ becomes true. In such a case, the authentication decryption device 20 correctly decrypts the ciphertext C' to the cleartext M.

The authenticated encryption handled by the authenticated encryption system 1 is realized by combining a cryptographic algorithm having a specific input/output length. This cryptographic algorithm outputs data having the same bit length as that of the input data for input data having a specific bit length. Hereinafter, this cryptographic algorithm is referred to as a primitive in the authenticated encryption. The input/output length of the primitive is n bits, and n is an integer constant where n≥1.

Examples of primitives include block ciphers, keyless cryptographic permutations, and tweakable block ciphers.

In the encryption process in a block cipher, a k bit secret key K and an n-bit cleartext M are input, and an n-bit ciphertext C is output. k is an integer constant where k≥1. The encryption process in the block cipher is expressed as E(K, M)=C.

In the encryption process in a keyless cryptographic permutation, an n-bit cleartext M is input, and an n-bit ciphertext C is output. The encryption process in the keyless cryptographic permutation is expressed as P(M)=C.

In the encryption process in a tweakable block cipher, a k bit secret key K, a tw bit tweak (adjustment value) Tw, and an n-bit cleartext M are input, and an n-bit ciphertext C is output. tw is an integer constant where tw≥1. The encryption process in the tweakable block cipher is expressed as TE(K, Tw, M)=C or TE(Tw, M).

The above tweakable block cipher is also realized by a block cipher E or a keyless cryptographic permutation P.

For example, by using a cipher use mode called XEX* mode, it is possible to execute a tweakable block cipher using the entire key as one block cipher key. XEX* is a general term for two types of tweakable block ciphers, XEX and XE, and one tweakable block cipher can be realized by appropriately and selectively using these two types.

Letting the tweak be Tw=(i, N), XEX can be expressed as Equation (2).

[Equation 2]

$$XEX(K,Tw,M)=E(K,\text{mult}(2^i,E(K,N))\oplus M)\oplus \text{mult}(2^i,E(K,N)) \quad (2)$$

The symbol "+" enclosed in a circle indicates an exclusive OR (XOR). The exclusive OR operator is also presented as "XOR".

mult(•,•) indicates the product of two elements on the Galois field $GF(2^n)$. $2^i$ indicates the $2^i$ power over the Galois field $GF(2^n)$. The exponent i is an integer where i≥1.

XE can be expressed as Equation (3).

[Equation 3]

$$XE(K,Tw,M)=E(K,\text{mult}(2^i,E(K,N))\oplus M) \quad (3)$$

mult(A, B) is also expressed as A·B.

Moreover, when using a cipher use mode called TEM mode, it is possible to execute a tweakable block cipher using the keyless cryptographic permutation P and a keyed function H for n-bit input/output having the key K. The TEM mode can be expressed as Equation (4).

[Equation 4]

$$TEM(K,Tw,M)=P(H(K,Tw)\oplus M)\oplus H(K,Tw) \quad (4)$$

In the case where H is an AXU universal hash function and H is uniform, the configuration of Equation (4) realizes a secure tweakable block cipher. The case where H is an AXU universal hash function refers to a case where the probability Pr[H(K, X) XOR H(K, X')=c] is small for any n-bit c for a randomly selected secret key K and any different two inputs X and X'. The case where H is uniform refers to a case where the probability Pr[H(K, X)=Y] is sufficiently small for a randomly selected secret key K, an arbitrary input X, and an arbitrary output Y.

The authenticated encryption OCB2 disclosed in Non-Patent Document 2 is a rate 1 authenticated encryption method using the tweakable block cipher XEX*. The rate 1 method is a method in which the number of primitive uses per cleartext block is one asymptotically.

In OCB2, cleartext is encrypted by using XEX* in a manner similar to that of the ECB mode. More specifically, in the case where the cleartext M is composed of m 128-bit blocks M[1], M[2], . . . , M[m], the i-th cleartext block M[i] where 1≤i≤m−1 is encrypted into a ciphertext block C[i] as in Equation (5).

[Equation 5]

$$C[i]=XEX(K,(1,0,N),M[i])=E(K,2^i \cdot \Delta \oplus M[i])+2^i \cdot \Delta \qquad (5)$$

Here, Δ=E(K, N). Moreover, the "2" mentioned above is also expressed as 10 in binary expression. Therefore, "2" is equivalent to x in the polynomial expression in a Galois field defined by Equation (6), and is a primitive element of the multiplicative group of $GF(2^{128})$.

[Equation 6]

$$GF(2^{128})=GF(2)[x]/(x^{128}+x^7+x^2+x+1) \qquad (6)$$

On the other hand, M[m] is encrypted in a manner similar to that in the case of the CTR mode as in Equation (7).

[Equation 7]

$$C[m]=XEX(K,(m,0,N),\mathrm{len}(M[m])) \oplus M[m] = E(K, 2^m \cdot \Delta \oplus \mathrm{len}(M[m])) \oplus 2^m \cdot \Delta \oplus M[m] \qquad (7)$$

len(•) is a function that converts the argument length information into a bit sequence. As can be seen from the above description, in OCB2, the input/output mask of a block cipher used for cleartext encryption is all represented by multiplying the value of the power of 2 over the Galois field by the value obtained by encrypting the initialization vector N.

In OCB2, the checksum obtained by dividing the cleartext into 128-bit segments and taking the exclusive OR thereof is encrypted using XE, and the result thereof is used as a tag. Specifically, in the case where the cleartext M is composed of m 128-bit blocks M[1], M[2], . . . , M[m], the checksum $SUM_{OCB2}$ is expressed as Equation (8).

[Equation 8]

$$SUM_{OCB2}=M[1] \oplus M[2] \oplus \ldots \oplus M[m] \qquad (8)$$

The tag $T_{OCB2}$ is expressed as Equation (9).

[Equation 9]

$$T_{OCB2}=XE(K,(m,1,N),SUM_{OCB2})=E(K, 2^m \cdot 3 \cdot \Delta \oplus SUM_{OCB2}) \qquad (9)$$

Here, Δ is expressed as Equation (10).

[Equation 10]

$$\Delta = E(K,N) \qquad (10)$$

Moreover, since "3" in Equation (9) is also expressed as 11 in the binary expression, it is an expression equivalent to x+1 in the Galois field $GF(2^{128})$ as defined above. As can be seen from the above equations, the input mask of a block cipher used for tag generation in OCB2 is represented by a value obtained by multiplying the mask value used for cleartext encryption by 3. The mask used in generating a tag is called a special mask.

[Description of Authentication Encryption Device Configuration]

Figure 2:
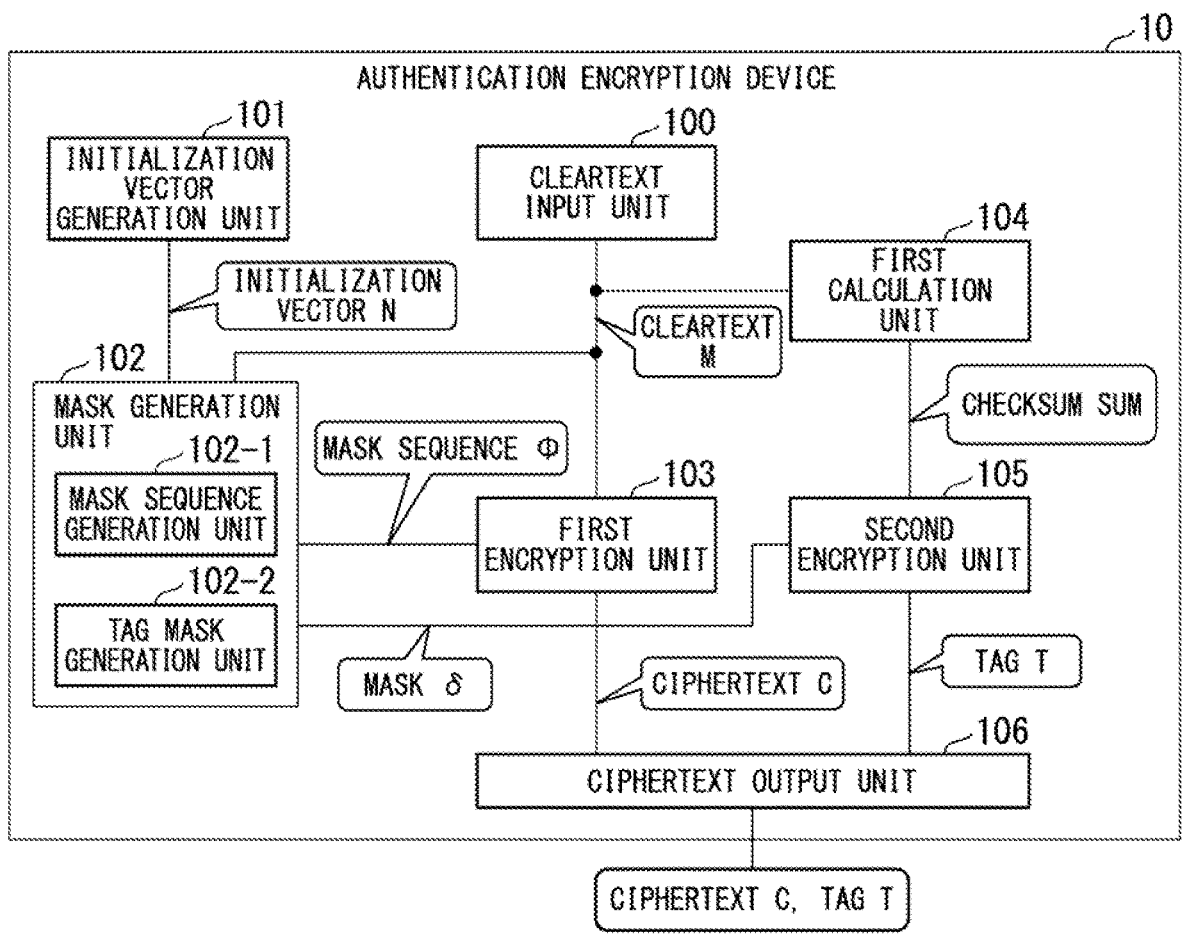
FIG. 2 is a block diagram showing a configuration example of an authentication encryption device according to the first example embodiment.

FIG. 2 is a block diagram showing a configuration example of an authentication encryption device according to the first example embodiment. As shown in FIG. 2, the authentication encryption device 10 includes a cleartext input unit 100, an initialization vector generation unit 101, a mask generation unit 102, a first encryption unit 103, a first calculation unit 104, a second encryption unit 105, and a ciphertext output unit 106. The mask generation unit 102 includes a mask sequence generation unit 102-1 and a tag mask generation unit 102-2.

The cleartext input unit 100 accepts an input of a cleartext M to be encrypted. The method in which the cleartext input unit 100 accepts an input of cleartext M is not limited to a particular method. For example, the cleartext input unit 100 may include a character input device such as a keyboard so as to accept a user operation for inputting a cleartext M. Alternatively, the cleartext input unit 100 may receive a cleartext M from another device.

The initialization vector generation unit 101 generates an initialization vector different from values generated previously. For example, the initialization vector generation unit 101 may initially output an arbitrary fixed value as an initialization vector. For the second and subsequent iterations, the initialization vector generation unit 101 may preliminarily store the value of the initialization vector generated immediately before, and may output the value obtained by adding 1 to the value of the immediately preceding initialization vector. In such a case, when the value of the initialization vector used last is N, the value of the new initialization vector is N'=N+1. At this time, an update of the initialization vector can be expressed by using an initialization vector update function f(N)=N+1. The initialization vector N may be n-bit data. In the case where the initialization vector N is shorter than n bits, the initialization vector generation unit 101 performs padding so that the initialization vector N becomes n-bit data.

The mask generation unit 102 outputs the mask sequence Φ and the mask δ generated by exponentiating the primitive element of the multiplicative group of the Galois field, using the cleartext M output by the cleartext input unit 100, the initialization vector N output by the initialization vector generation unit 101, and the secret key K. The mask sequence generation unit 102-1 generates a mask sequence Φ and the tag mask generation unit 102-2 generates a mask sequence δ. In the case where the cleartext M is composed of m n-bit blocks M[1], M[2], . . . , M[m], the mask sequence Φ is expressed as Equation (11).

[Equation 11]

$$\Phi=(\Phi(1),\Phi(2), \ldots ,\Phi(m))=(\sigma^1 \cdot \Delta, \sigma^2 \cdot \Delta, \ldots ,\sigma^m \cdot \Delta) \qquad (11)$$

Δ indicates a basic mask value uniquely determined from the initialization vector N, the secret key K, and a constant. The constant here indicates the value input as a tweak to the tweakable block cipher. For example, in the case where Δ=E(K, N) as mentioned above, this constant takes a value of 1. Alternatively, in the case where Δ=2·E(K, N), this constant takes a value of 2.

σ indicates a primitive element of the multiplicative group of a Galois field.

The mask δ is expressed as Equation (12).

[Equation 12]

$$\delta=\sigma^{m+1} \cdot \Delta \qquad (12)$$

For example, the basic mask value Δ is expressed as Equation (10) mentioned above, using a block cipher E that uses the secret key K.

The mask sequence generation unit 102-1 corresponds to an example of a mask sequence generation means. The tag mask generation unit 102-2 corresponds to an example of a tag mask generation means.

The first encryption unit 103 encrypts the cleartext M output by the cleartext input unit 100, using the mask sequence Φ output by the mask generation unit 102. For encrypting the cleartext M, the first encryption unit 103 uses a tweakable block cipher realized by computing an exclusive OR with use of a mask value, in primitive inputting and outputting of n-bit input/output.

Then, the first encryption unit 103 outputs the result of encrypting the cleartext M. The encryption result output by the first encryption unit 103 is presented as ciphertext C. The first encryption unit 103 can be realized by using a normal n-bit block cipher or a keyless cryptographic permutation. For example, in the case where the cleartext M is composed of m n-bit blocks M[1], M[2], . . . , M[m] and the first encryption unit 103 uses XEX to encrypt the cleartext M, M[i] can be encrypted as in Equation (13) where 1≤i≤m.

[Equation 13]

$$C[i]=E(K,\sigma^i \cdot \Delta \oplus M[i])+\sigma^i \cdot \Delta \qquad (13)$$

K indicates a secret key. E indicates a block cipher that uses the secret key K.

Alternatively, the first encryption unit 103 may encrypt the cleartext M, using an encryption method other than XEX such as TEM.

The first encryption unit 103 corresponds to an example of a first encryption means.

The first calculation unit 104 calculates an n-bit checksum SUM from a cleartext M output by the cleartext input unit 100, by means of a simple calculation. For example, the first calculation unit 104 may calculate the exclusive OR (XOR) of all cleartext blocks as a checksum SUM. If the final block is less than n bits, the first calculation unit 104 applies appropriate padding to the final block and then calculates the exclusive OR. Alternatively, the first calculation unit 104 may use arithmetic addition, cyclic redundancy code (CRC), or the like instead of exclusive OR.

The first calculation unit 104 corresponds to an example of a checksum calculation means.

The second encryption unit 105 encrypts the checksum SUM having an n-bit value output by the first calculation unit 104, using the mask δ output by the mask generation unit 102. Specifically, the first encryption unit 103 uses a tweakable block cipher realized by computing an exclusive OR with use of the value of the mask δ (mask value), in primitive inputting and outputting of n-bit input/output, to thereby encrypt the checksum SUM.

The second encryption unit 105 corresponds to an example of a second encryption means.

The second encryption unit 105 converts the encrypted value into a t-bit value where t≤n by means of an appropriate contraction function, and generates a tag T. For example, in the case where the first encryption unit 103 has used a mask sequence Φ=(σ¹·Δ,σ²·Δ, . . . , σᵐ·Δ) to perform tweakable encryption by means of XEX, the second encryption unit 105 performs tweakable block encryption using a mask δ=σ^(m+1)·Δ to perform tweakable block encryption by means of XE. A contraction function may be, for example, a function that outputs only the upper t bits.

The above example can be presented as Equation (14).

[Equation 14]

$$T=msb_t(\text{Tag}_n) \qquad (14)$$

$msb_t(\cdot)$ indicates a function that outputs the upper t bits. $\text{Tag}_n$ is expressed as Equation (15).

[Equation 15]

$$\text{Tag}_n = E(K, \sigma^{m+1} \cdot \Delta \oplus SUM) \qquad (15)$$

The ciphertext output unit 106 concatenates the ciphertext C output by the first encryption unit 103 and the tag T output by the second encryption unit 105, and outputs it to a computer display, a printer, or the like.

Description of Operation

Figure 3:
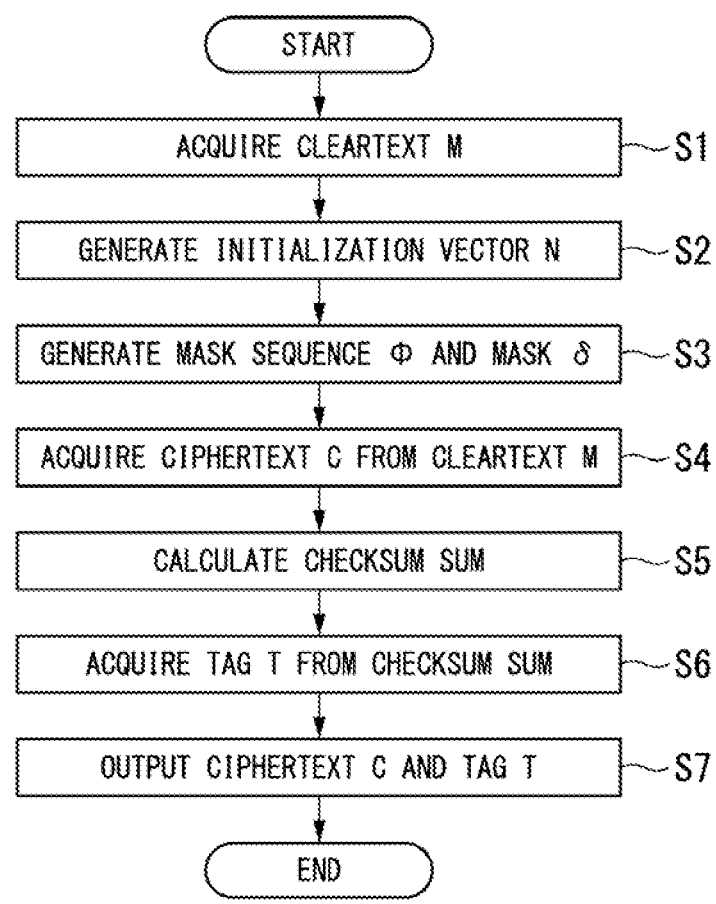
FIG. 3 is a flowchart showing an operation of the authentication encryption device according to the first example embodiment.

FIG. 3 is a flowchart showing an operation of the authentication encryption device 10.
(Step S1)
The cleartext input unit 100 accepts an input of a cleartext M to be encrypted.
(Step S2)
The initialization vector generation unit 101 generates an initialization vector N different from values generated previously.
(Step S3)
The mask generation unit 102 generates the mask sequence Φ and the mask δ generated by exponentiating the primitive element of the multiplicative group of the Galois field, using the cleartext M output by the cleartext input unit 100 and the initialization vector N output by the initialization vector generation unit 101.
(Step S4)
The first encryption unit 103 encrypts the cleartext M output by the cleartext input unit 100, using the mask sequence Φ output by the mask generation unit 102, and outputs the ciphertext C. For encrypting the cleartext M, the first encryption unit 103 uses a tweakable block cipher realized by computing an exclusive OR with use of a mask value, in primitive inputting and outputting of n-bit input/output.
(Step S5)
The first calculation unit 104 calculates an n-bit checksum SUM from a cleartext M output by the cleartext input unit 100, by means of a simple calculation.
(Step S6)
The second encryption unit 105 encrypts the checksum SUM having an n-bit value output by the first calculation unit 104, using the mask δ output by the mask generation unit 102. Specifically, the second encryption unit 105 uses a tweakable block cipher realized by computing an exclusive OR with use of a mask value, in primitive inputting and outputting of n-bit input/output. The second encryption unit 105 converts the encrypted value into a t-bit value where t≤n by means of an appropriate contraction function, and generates a tag T.
(Step S7)
The ciphertext output unit 106 concatenates the ciphertext C output by the first encryption unit 103 and the tag T output by the second encryption unit 105, and outputs it to a computer display, a printer, or the like.

After Step S7, the authentication encryption device 10 ends the process of FIG. 3.

Description of Effect

As described above, the mask sequence generation unit 102-1 generates a mask sequence having, as an element, multiplication, in a Galois field, of a basic mask defined on the basis of an initialization vector, a secret key, and a constant and primitive elements of a multiplicative group of the Galois field raised to the power of exponents differing per cleartext block. The tag mask generation unit 102-2 generates a mask for tag generation by the multiplication, in the Galois field, of the basic mask and a primitive element of the multiplicative group of the Galois field raised to the power of an exponent differing from the exponents in any of the elements in the mask sequence. The first encryption unit 103 encrypts cleartext, using a tweakable block cipher for computing exclusive OR for which the elements in the mask sequence are used respectively in primitive inputting and outputting. The first calculation unit 104 calculates the checksum of the cleartext, using the cleartext block. The second encryption unit 105 encrypts the checksum using the tweakable block cipher for computing exclusive OR for which the mask for tag generation is used in at least the inputting from among the primitive inputting and outputting, and generates a tag for authentication.

In the authentication encryption device 10 of the first example embodiment, it is possible to acquire a special mask used by the second encryption unit 105 without solving a discrete logarithm problem over a finite field.

In the existing technique, the constituent that corresponds to the first encryption unit 103 uses a mask sequence generated by means of an exponentiation of the primitive element of the multiplicative group of the Galois field and a result of encrypting the initialization vector N. Also, in the existing technique, the constituent that corresponds to the second encryption unit 105 uses a mask generated by means of a special element, an exponentiation of the primitive element of the multiplicative group of the Galois field, and a result of encrypting the initialization vector N. The special element mentioned here is an element the security of which is guaranteed by preliminarily solving a discrete logarithm problem over the finite field.

In the authentication encryption device 10, the same technique as the existing technique can be used as a method for the first encryption unit 103 to generate a mask sequence. On the other hand, the second encryption unit 105 generates a special mask on the basis of the result of encrypting the result of exponentiating the primitive element of the multiplicative group of the Galois field and the initialization vector N, without using a special element. Therefore, the second encryption unit 105 can generate a special mask without solving a discrete logarithm problem over the finite field.

The same as in the present example embodiment cannot be performed in the existing technique because there are restrictions concerning the security evaluation method. On the other hand, in the present example embodiment, by using a safety evaluation method different from that in the existing technique, a special mask can be generated without defining a special element, and there is no need for solving a discrete logarithm problem over a finite field. The primary reason why such an effect can be attained relates to the decryption function, and therefore, the reason will be described in detail in Effect of Decryption Device.

In the authentication encryption device 10, it is not necessary to solve a discrete logarithm problem over a finite field, so that an authenticated encryption that uses a primitive having an arbitrary input/output length can be easily configured. In addition, in the authentication encryption device 10, it is not necessary to solve a discrete logarithm problem over a finite field, so that the degree of freedom is high in the irreducible polynomial that defines a finite field. As described above, according to the authentication encryption device 10, it is possible to configure an easily scalable authenticated encryption.

Moreover, in the authentication encryption device 10, the asymptotic security does not change as compared with that in the existing technique. In addition, it can be said that the authentication encryption device 10 is efficient in terms of efficiency of encryption/decryption processing, because a special mask can be obtained by exponentiating a primitive element, without using a special element. This is because, in general, a primitive element σ is selected so as to make the encryption and decryption processing most efficient in accordance with the environment in which the encryption method is implemented.

[Description of Decryption Device Configuration]

Figure 4:
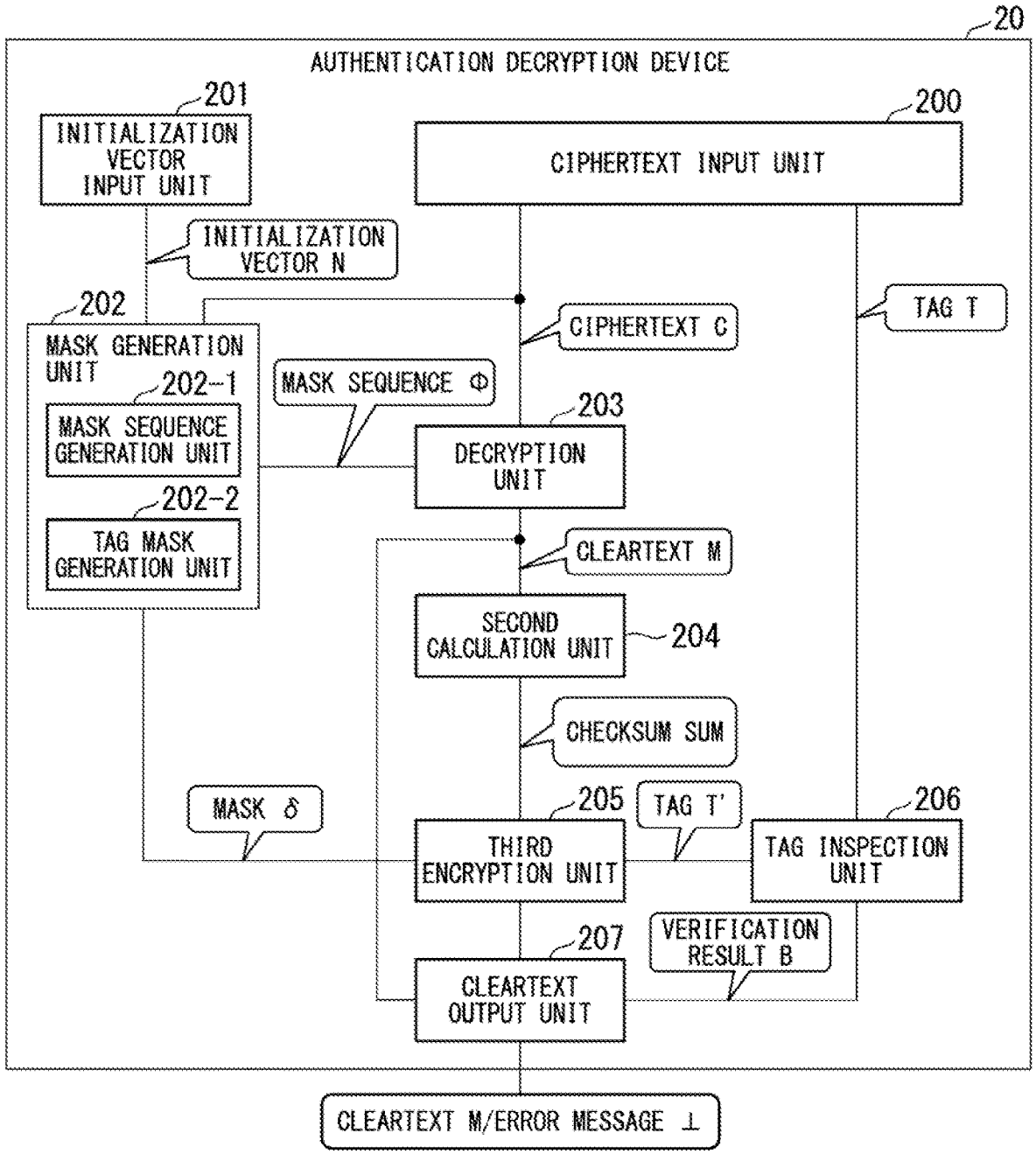
FIG. 4 is a block diagram showing a configuration example of an authentication decryption device according to the first example embodiment.

FIG. 4 is a block diagram showing a configuration example of an authentication decryption device according to the first example embodiment. As shown in FIG. 4, the authentication decryption device 20 includes a ciphertext input unit 200, an initialization vector input unit 201, a mask generation unit 202, a decryption unit 203, a second calculation unit 204, a third encryption unit 205, a tag inspection unit 206, and a cleartext output unit 207. The mask generation unit 202 includes a mask sequence generation unit 202-1 and a tag mask generation unit 202-2.

The authentication decryption device 20 decrypts a ciphertext C'. The ciphertext C' in the first example embodiment is a ciphertext acquired by the authentication decryption device 20, which is a ciphertext C output by the authentication encryption device 10 of the first example embodiment. The ciphertext C' may be a ciphertext received by the authentication decryption device 20, which is a ciphertext C transmitted by the authentication encryption device 10.

For example, in the case where the ciphertext C and the ciphertext C' are the same (that is, C'=C) and the authentication decryption device 20 succeeds in decryption, the authentication decryption device 20 correctly decrypts the ciphertext C' to the cleartext M.

Moreover, the authentication decryption device 20 uses a tag T output by the authentication encryption device 10 to determine whether or not the ciphertext C has been tampered with.

The ciphertext input unit 200 accepts an input of the decryption target ciphertext C and the tag T. The method in which the ciphertext input unit 200 accepts an input of a ciphertext C is not limited to a particular method. For example, the ciphertext input unit 200 may include a character input device such as a keyboard so as to accept a user operation for inputting a ciphertext C. Alternatively, the ciphertext input unit 200 may receive a ciphertext C from another device such as the authentication encryption device 10.

The initialization vector input unit 201 accepts an input of the initialization vector N for decrypting the ciphertext C. The initialization vector input unit 201 acquires the initialization vector N that was used when the authentication encryption device encrypted the cleartext M into the decryption target ciphertext C.

The method in which the initialization vector input unit 201 accepts an input of an initialization vector N is not limited to a particular method. For example, the initialization vector input unit 201 may include a character input device such as a keyboard so as to accept a user operation for inputting an initialization vector N. Alternatively, the initialization vector input unit 201 may receive an initialization vector N from another device such as the authentication encryption device 10.

The mask generation unit 202 outputs a mask sequence Φ and a mask δ generated by exponentiating the primitive element of the multiplicative group of the Galois field, using the ciphertext C output by the ciphertext input unit 200, the initialization vector N output by the initialization vector input unit 201, and the secret key K. The mask sequence generation unit 202-1 generates a mask sequence Φ and the tag mask generation unit 202-2 generates a mask sequence δ.

The mask generation unit 202 performs the same processing as that in which the mask generation unit 102 in the first example embodiment generates a mask sequence Φ and a mask δ, and generates the same mask sequence Φ and mask δ as those in the encryption process.

The mask sequence generation unit 202-1 corresponds to an example of a mask sequence generation means. The tag mask generation unit 202-2 corresponds to an example of a tag mask generation means.

The decryption unit 203 decrypts the ciphertext C output by the ciphertext input unit 200, using the mask sequence Φ output by the mask generation unit 202. For decrypting the ciphertext C, the decryption unit 203 uses a tweakable block cipher realized by computing an exclusive OR with use of a mask value, in primitive inputting and outputting of n-bit input/output. The decryption unit 203 decrypts the ciphertext C'. As described above regarding the authentication decryption device 20, in the case where the decryption unit 203 succeeds in decryption, the decryption unit 203 correctly decrypts the ciphertext C' to the cleartext M. Then, the decryption unit 203 outputs the decryption result.

The decryption unit 203 corresponds to an example of a decryption means.

The decryption unit 203 executes the decryption processing by performing a process that corresponds to the reciprocal function of the encryption performed by the first encryption unit 103 in the first example embodiment. For example, consider a case where a ciphertext C is composed of m n-bit blocks C[1], C[2], . . . , [m] and the first encryption unit 103 performs encryption using XEX. In such a case, where 1≤i≤m, C[i] can be decrypted as in Equation (16), using a decryption function D for a block cipher E that uses a secret key K.

[Equation 16]

$$M[i]=D(K,\sigma^i \cdot \Delta \oplus C[i]) \oplus \sigma^i \cdot \Delta \quad (16)$$

The second calculation unit 204 calculates an n-bit checksum SUM from a cleartext M output by the decryption unit 203, by means of a simple calculation. The second calculation unit 204 performs the same processing as that in which the first calculation unit 104 in the first example embodiment calculates a checksum SUM, and calculates a checksum SUM.

The second calculation unit 204 corresponds to an example of a checksum calculation means.

The third encryption unit 205 encrypts the checksum SUM having an n-bit value output by the second calculation unit 204, using δ output by the mask generation unit 202. For encrypting the SUM, the third encryption unit 205 uses a tweakable block cipher realized by computing an exclusive OR with use of a mask value, in the input of the primitive of n-bit input/output. The third encryption unit 205 converts the encrypted value into a t-bit value where t≤n, by means of an appropriate contraction function, and generates a tag T'. The third encryption unit 205 performs the same processing as that in which the second encryption unit 105 in the first example embodiment generates a tag T, and generates the tag T'.

The third encryption unit 205 corresponds to an example of a tag generation means.

The tag inspection unit 206 compares the tag T output by the ciphertext input unit 200 and the tag T' output by the third encryption unit 205 with each other. Specifically, the tag inspection unit 206 determines whether or not the tag T and the tag T' match with each other.

If it is determined that the tag T and the tag T' match with each other, the tag inspection unit 206 sets the verification result to ACK. ACK indicates that the ciphertext C has not been tampered with. The authentication result is presented as B, and the authentication result being ACK is expressed as B=ACK.

If it is determined that the tag T and the tag T' do not match with each other, the tag inspection unit 206 sets the verification result to NCK. NCK indicates that the ciphertext C has been tampered with. The authentication result being NCK is expressed as B=NCK.

The tag inspection unit 206 outputs the verification result B. The tag inspection unit 206 corresponds to an example of a tag inspection means.

The cleartext output unit 207 takes an input of the cleartext M output by the decryption unit 203 and an input of the verification result B output by the tag inspection unit 206, and outputs the cleartext M if B=ACK, and outputs an error message ⊥ if B=NCK.

The method in which the cleartext output unit 207 outputs the cleartext M or the error message ⊥ is not limited to a particular method. For example, the cleartext output unit 207 may output the cleartext M or the error message ⊥ to a computer display, a printer, or the like. Alternatively, the cleartext output unit 207 may transmit the cleartext M or the error message ⊥ to another device such as a computer.

Description of Operation

Figure 5:
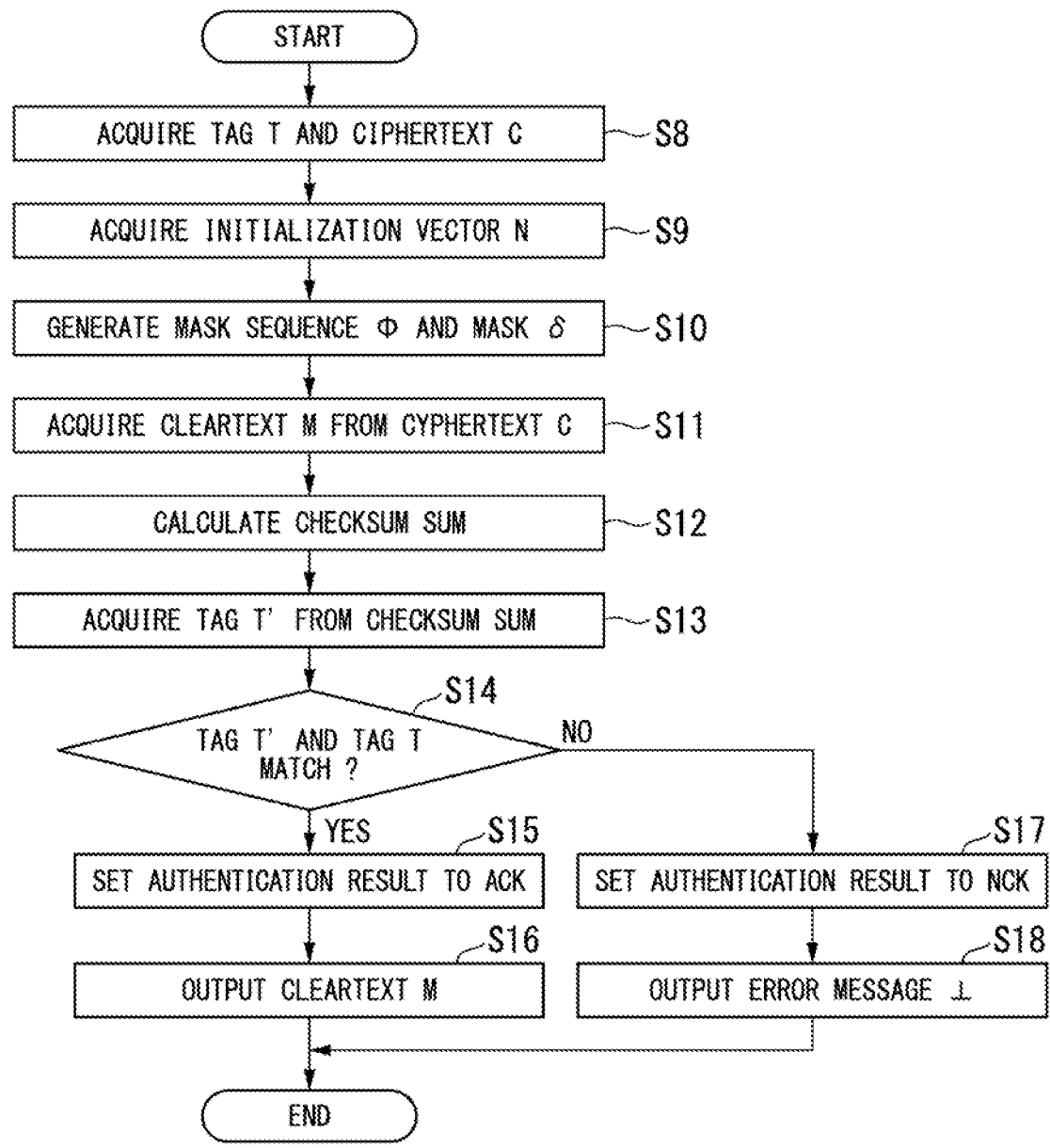
FIG. 5 is a flowchart showing an operation of the authentication decryption device according to the first example embodiment.

FIG. 5 is a flowchart showing an operation of the authentication decryption device 20.
(Step S8)
The ciphertext input unit 200 accepts an input of the decryption target ciphertext C and the tag T.
(Step S9)
The initialization vector input unit 201 accepts an input of the initialization vector N for decrypting the ciphertext C.
(Step S10)
The mask generation unit 202 generates a mask sequence Φ and a mask δ generated by exponentiating the primitive element of the multiplicative group of the Galois field, using the ciphertext C output by the ciphertext input unit 200 and the initialization vector N output by the initialization vector input unit 201.
(Step S11)
The decryption unit 203 decrypts the ciphertext C output by the ciphertext input unit 200, using the mask sequence Φ output by the mask generation unit 202, and outputs the cleartext M. For decrypting the ciphertext C, the decryption unit 203 uses a tweakable block cipher realized by computing an exclusive OR with use of a mask value, in primitive inputting and outputting of n-bit input/output.
(Step S12)
The second calculation unit 204 calculates an n-bit checksum SUM from a cleartext M output by the decryption unit 203, by means of a simple calculation.
(Step S13)
The third encryption unit 205 encrypts the checksum SUM having an n-bit value output by the second calculation unit 204, using the mask δ output by the mask generation unit 202. At this time, for encrypting the SUM, the third encryption unit 205 uses a tweakable block cipher realized by computing an exclusive OR with use of a mask value, in primitive inputting of n-bit input/output. Then the encrypted value is converted into a t-bit value where t≤n, by means of an appropriate contraction function to thereby generate a tag T'.
(Step S14)

The tag inspection unit 206 determines whether or not the tag T output by the ciphertext input unit 200 and the tag T' output by the third encryption unit 205 match with each other. The tag T and the tag T' matching with each other means that the value of the tag T and the value of the tag T' are the same (that is, T=T').

If the tag inspection unit 206 determines the tag T and the tag T' as matching with each other (Step S14: YES), the process proceeds to Step S15.

If the tag inspection unit 206 determines the tag T and the tag T' as not matching with each other (Step S14: NO), the process proceeds to Step S17.
(Step S15)

The tag inspection unit 206 sets the verification result to ACK.
(Step S16)

The cleartext output unit 207 outputs the cleartext M.

After Step S16, the authentication decryption device 20 ends the process of FIG. 5.
(Step S17)

The tag inspection unit 206 sets the verification result to NCK.
(Step S18)

The cleartext output unit 207 outputs the error message 1.

After Step S18, the authentication decryption device 20 ends the process of FIG. 5.

Description of Effect

As described above, the mask sequence generation unit 202-1 generates a mask sequence having, as an element, multiplication, in a Galois field, of a basic mask defined on the basis of an initialization vector, a secret key, and a constant and a primitive element of a multiplicative group of the Galois field raised to the power of exponents differing per cleartext block. The tag mask generation unit 202-2 generates a mask for tag generation by the multiplication, in the Galois field, of the basic mask and a primitive element of the multiplicative group of the Galois field raised to the power of an exponent differing from the exponents in any of the elements in the mask sequence. The decryption unit 203 decrypts a cipher block into a cleartext block, using a tweakable block cipher for computing exclusive OR for which the elements in the mask sequence are used respectively in inputting and outputting of a decryption function. The second calculation unit 204 calculates the checksum of the cleartext, using the cleartext block. The third encryption unit 205 encrypts the checksum using a tweakable block cipher for computing exclusive OR for which the mask for tag generation is used in at least the inputting from among the inputting and outputting of an encryption function, which is a reciprocal function of the decryption function, and generates a tag for authentication. The tag inspection unit 206 uses the tag to decide whether to accept or not to accept the result of decryption performed by the decryption unit.

In the authentication decryption device 20, it is possible to generate a special mask used by the third encryption unit 205 without solving a discrete logarithm problem over a finite field. In the authentication decryption device 20, it is not necessary to solve a discrete logarithm problem over a finite field, so that an authenticated encryption that uses a primitive having an arbitrary input/output length can be easily configured. In addition, in the authentication decryption device 20, it is not necessary to solve a discrete logarithm problem over a finite field, so that the degree of freedom is high in the irreducible polynomial that defines a finite field. As described above, according to the authentication decryption device 20, it is possible to configure an easily scalable authenticated encryption.

Moreover, according to the authentication decryption device 20, the asymptotic security does not change as compared with that in the existing technique. In addition, it can be said that the authentication decryption device 20 is efficient in terms of efficiency of encryption/decryption processing, because a special mask can be obtained by exponentiating a primitive element, without using a special element. These effects are the same as those in the authentication encryption device 10 of the first example embodiment.

The reason why these effects can be attained will be described below. In security certification of the existing technique, in order to simplify certification, it is assumed that an unverified tag falls into an attacker's hands when decrypting an authenticated encryption. In the authentication decryption device 20, the tag T' output by the third encryption unit 205 corresponds to the unverified tag.

If the unverified tag has fallen into an attacker's hands when decrypting an authentication unit as with this assumption, encryption performed by the authentication encryption device 10 and decryption performed by the authentication decryption device 20 are not secure.

However, it is generally believed that attackers are unable to know an unverified tag and are only able to know whether tags match with each other or not match with each other. Therefore, the security of the authentication encryption device 10 and the authentication decryption device 20 is evaluated on the premise that the unverified tag is not known to the attacker.

The authentication encryption device 10, for encrypting a cleartext, uses a tweakable block cipher in which an exclusive OR is computed with use of a mask, in primitive inputting and outputting, and, for encrypting a checksum, uses a tweakable block cipher in which an exclusive OR is computed with use of a mask, only in primitive inputting. As a result, according to the authentication encryption device 10 and the authentication decryption device 20, the attacker cannot calculate the mask value. In this respect, according to the authentication encryption device 10 and the authentication decryption device 20, a level of security equivalent to that of the existing technique can be attained.

Second Example Embodiment

In a second example embodiment, an example of a case will be described where a block cipher is used as a primitive, XEX is used in cleartext encryption, and XE is used in encryption for tag generation.

[Description of Authentication Encryption Device Configuration]

Figure 6:
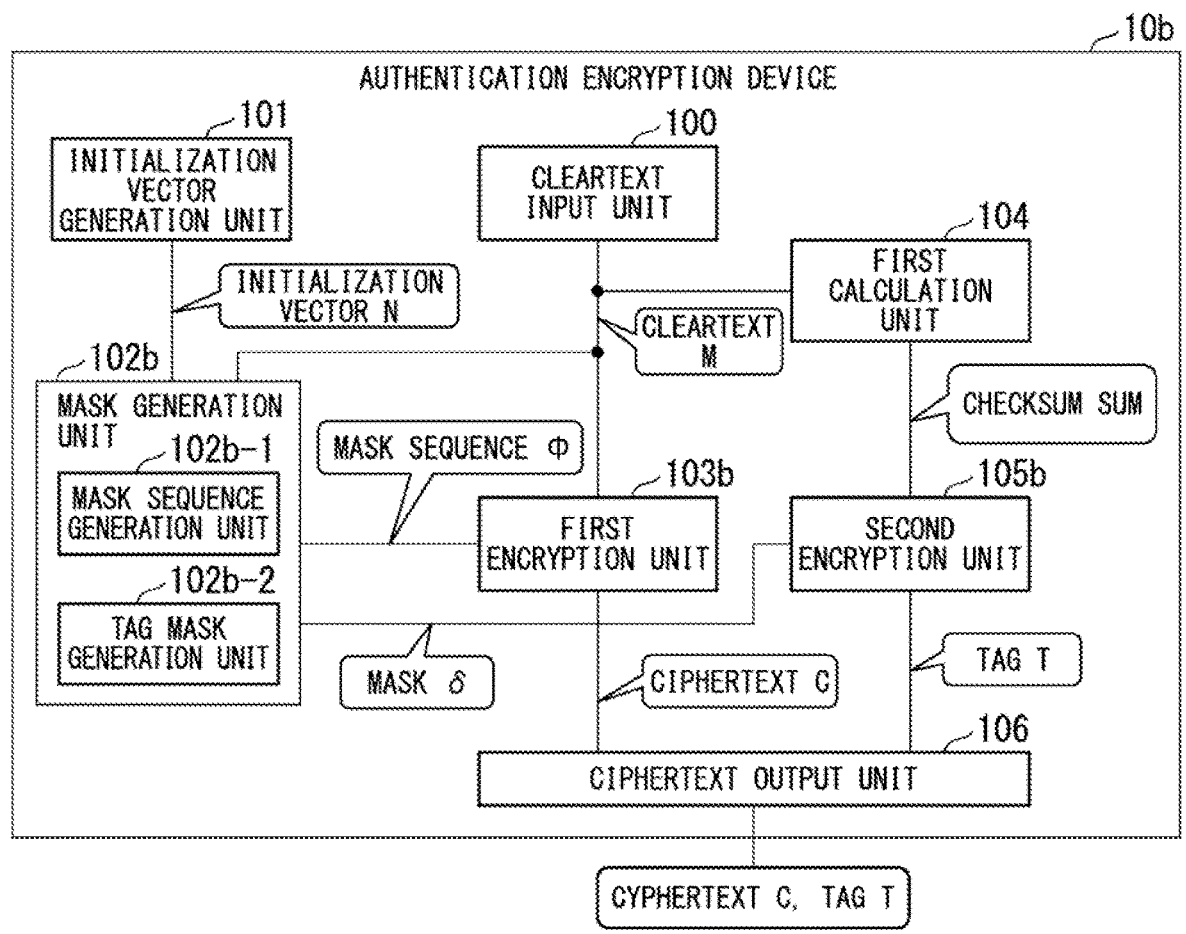
FIG. 6 is a block diagram showing a configuration example of an authentication encryption device according to a second example embodiment.

FIG. 6 is a block diagram showing a configuration example of an authentication encryption device according to the second example embodiment. As shown in FIG. 6, the authentication encryption device 10b includes a cleartext input unit 100, an initialization vector generation unit 101, a mask generation unit 102b, a first encryption unit 103b, a first calculation unit 104, a second encryption unit 105b, and a ciphertext output unit 106. The mask generation unit 102*b* includes a mask sequence generation unit 102*b*-1 and a tag mask generation unit 102*b*-2.

Of the constituents shown in FIG. 6, ones corresponding to those in FIG. 2 and having similar functions are given the same reference symbols (100, 101, 104, and 106), and descriptions thereof are omitted. In the authentication encryption device 10*b*, the computations performed by each of the mask generation unit 102*b*, the first encryption unit 103*b*, and the second encryption unit 105*b* are different from those in the case of the authentication encryption device 10 (FIG. 2). In other respects, the authentication encryption device 10*b* is similar to the authentication encryption device 10.

The authentication encryption device 10*b* and the authentication decryption device 20*b* embody the authentication encryption device 10 and the authentication decryption device 20 of the first example embodiment, and can be applied to the OCB (Offset Codebook).

The mask generation unit 102*b* calculates and outputs the mask sequence Φ on the basis of Equation (11) mentioned above. As mentioned above, σ indicates a primitive element of the multiplicative group of a Galois field. Δ is expressed as Equation (10) mentioned above.

The mask sequence generation unit 102*b*-1 of the mask generation unit 102*b* generates a mask sequence Φ.

Moreover, the mask generation unit 102*b* calculates and outputs a mask δ on the basis of Equation (12) mentioned above.

The tag mask generation unit 102*b*-2 of the mask generation unit 102*b* generates a mask for tag.

The first encryption unit 103*b* encrypts the cleartext M output by the cleartext input unit 100, using the mask sequence Φ output by the mask generation unit 102*b*.

In the second example embodiment, unlike the case of the first example embodiment, the cleartext M output by the cleartext input unit 100 is represented as a concatenation of m−1 n-bit blocks M[1], M[2], ..., M[m] and an n'-bit block M[m] where n'≤n. The first encryption unit 103*b* encrypts M[i] where 1≤i≤m, using the element Φ(i) of the mask sequence Φ. For encryption, the first encryption unit 103*b* uses a tweakable block cipher realized by computing an exclusive OR with use of a mask value, in the inputting and outputting of the block cipher of the n-bit input/output.

The first encryption unit 103*b* then obtains C[i], which is the encryption result of M[i], and generates a ciphertext C that is composed of m−1 n-bit blocks C[1], C[2], ..., C[m−1] and an n'-bit block C[m] where n'≤n. For example, as in Equation (17), the first encryption unit 103*b* encrypts M[i] where 1≤i<m, using a block cipher E that uses the secret key K and the mask value Φ(i).

[Equation 17]

$$C[i]=E(K,\Phi(i)\oplus M[i])+\Phi(i) \quad (17)$$

Next, as in Equation (18), the first encryption unit 103*b* encrypts M[m], using a function len(•), which converts the bit length information of an argument into an n-bit value, the secret key K, and the mask value Φ(m).

[Equation 18]

$$C[m]=M[m]\oplus msb_{n'}(Pad_n) \quad (18)$$

$msb_{n'}(•)$ is a function that outputs the upper n' bits. $Pad_n$ is expressed as Equation (19).

[Equation 19]

$$Pad_n=E(K,\Phi(m)\oplus len(M[m]))+\Phi(m) \quad (19)$$

The second encryption unit 105*b* encrypts the checksum SUM output by the first calculation unit 104, using the mask δ output by the mask generation unit 102*b*. For encrypting the checksum SUM, the second encryption unit 105*b* uses a tweakable block cipher realized by computing an exclusive OR with use of a mask value, only in the inputting of the block cipher of the n-bit input/output. The second encryption unit 105*b* encrypts the checksum SUM as in Equation (20).

[Equation 20]

$$Tag_n=E(K,\delta\oplus SUM) \quad (20)$$

The second encryption unit 105*b* converts the obtained $Tag_n$ into a t-bit value where t≤n by means of an appropriate contraction function, and generates a tag T. For example, the contraction function may be represented as Equation (14) mentioned above.

Figure 7:
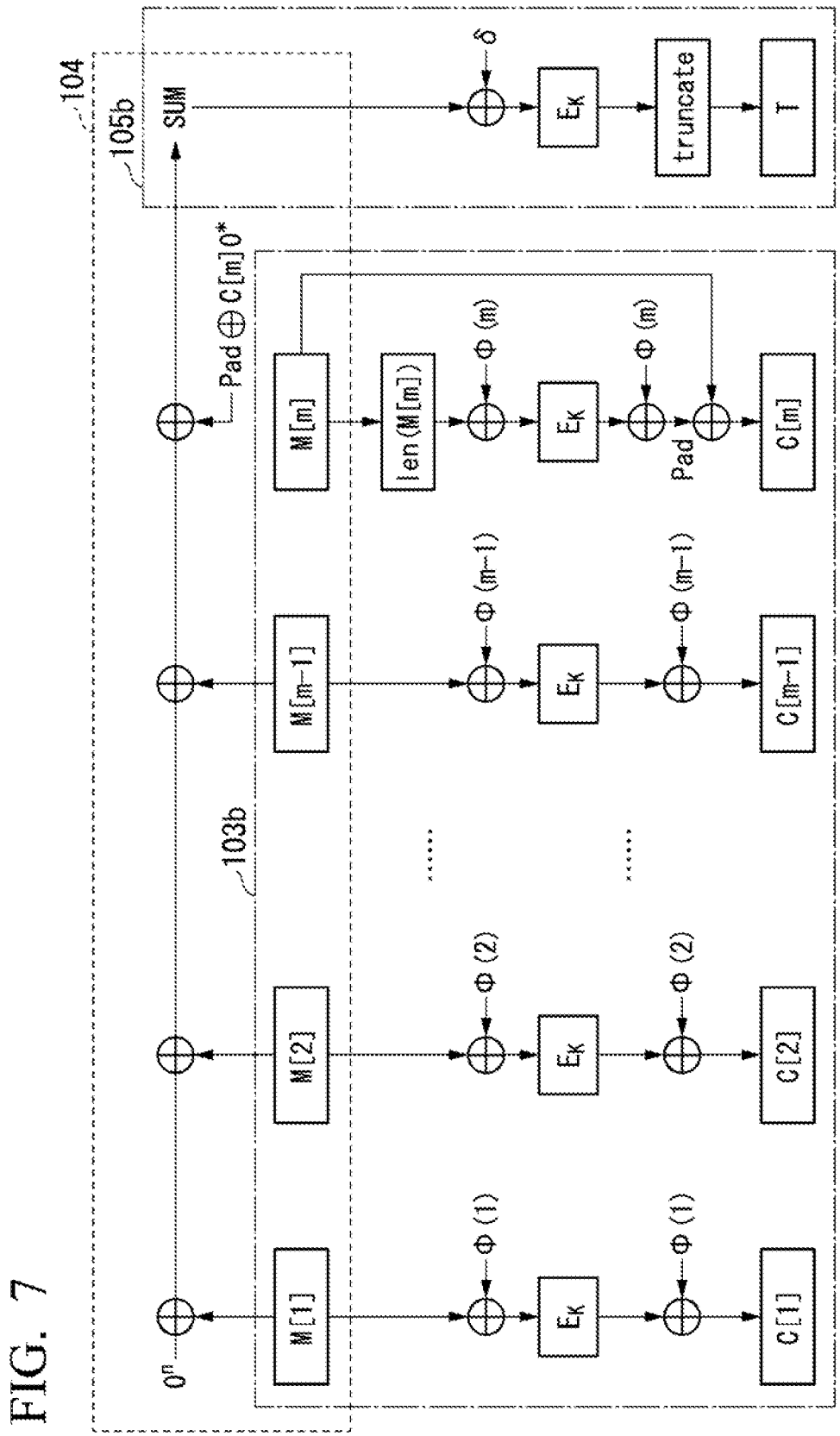
FIG. 7 is a diagram schematically showing an example of an encryption computation performed by the authentication encryption device according to the second example embodiment.

FIG. 7 is a diagram schematically showing an example of an encryption computation performed by the authentication encryption device 10*b*. FIG. 7 schematically shows an example of computations performed by the first encryption unit 103*b*, the first calculation unit 104, and the second encryption unit 105*b*.

As described above, the first encryption unit 103*b* encrypts M[i] where 1≤i<m as in Equation (17) mentioned above.

As described above in the description of the authentication encryption device 10, the first calculation unit 104 calculates the exclusive OR of all cleartext blocks as a checksum SUM. If the final block is less than n bits, the first calculation unit 104 applies appropriate padding to the final block and then calculates the exclusive OR.

"On" indicates n-bit data in which the value of each of all bits is "0". "Pad XOR C[m]0*" indicates the exclusive OR of C[m] padded by a bit value "0" and Pad.

As described above, the second encryption unit 105*b* encrypts the checksum SUM as in Equation (20), and applies a contraction function such as Equation (14) mentioned above to the obtained $Tag_n$ to thereby generate the tag T.

[Description of Authentication Decryption Device Configuration]

Figure 8:
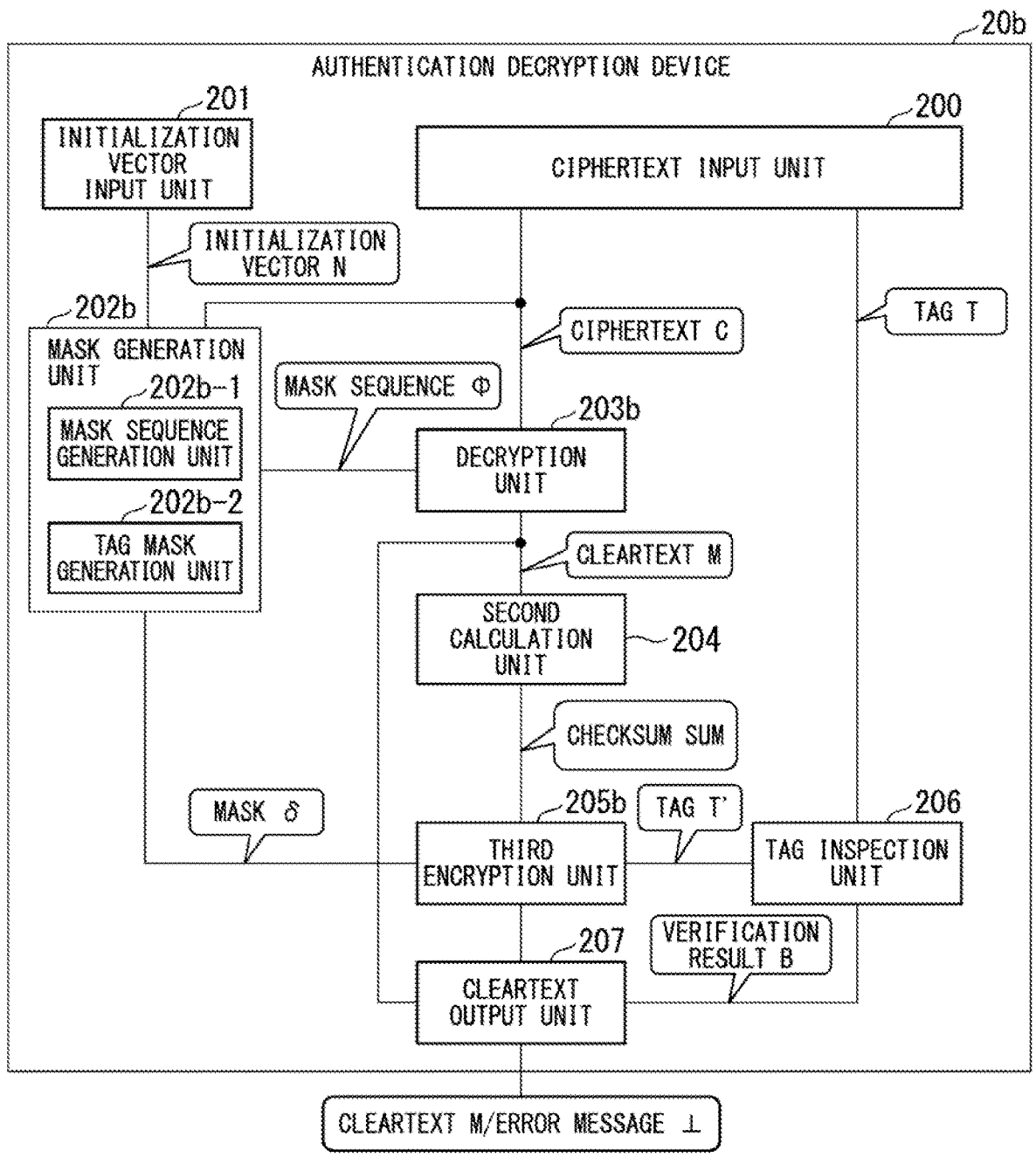
FIG. 8 is a block diagram showing a configuration example of an authentication decryption device according to the second example embodiment.

FIG. 8 is a block diagram showing a configuration example of an authentication decryption device according to the second example embodiment. As shown in FIG. 8, the authentication decryption device 20*b* includes a ciphertext input unit 200, an initialization vector input unit 201, a mask generation unit 202*b*, a decryption unit 203*b*, a second calculation unit 204, a third encryption unit 205*b*, a tag inspection unit 206, and a cleartext output unit 207. The mask generation unit 202*b* includes a mask sequence generation unit 202*b*-1 and a tag mask generation unit 202*b*-2.

Of the constituents shown in FIG. 8, ones corresponding to those in FIG. 4 and having similar functions are given the same reference symbols (200, 201, 204, 206, and 207), and descriptions thereof are omitted. In the authentication decryption device 20*b*, the computations performed by each of the mask generation unit 202*b*, the decryption unit 203*b*, and the third encryption unit 205*b* are different from those in the case of the authentication decryption device 20 (FIG. 4). In other respects, the authentication decryption device 20*b* is similar to the authentication decryption device 20.

The mask generation unit 202*b* is the same as the mask generation unit 102*b* in the authentication encryption device 10*b* (FIG. 6). The mask sequence generation unit 202*b*-1 is the same as the mask sequence generation unit 102b-1. The tag mask generation unit 202b-2 is the same as the tag mask generation unit 102b-2.

The decryption unit 203b performs decryption by means of the inverse computation of the encryption performed by the first encryption unit 103b.

The third encryption unit 205b is the same as the second encryption unit 105b.

The third encryption unit 205b corresponds to an example of a tag generation means.

Description of Effect

As described above, the mask sequence generation unit 102b-1 generates a mask sequence, using a basic mask on the basis of a block cipher that uses a secret key and the initialization vector. The tag mask generation unit 102b-1 generates a mask for tag generation, using the basic mask. The first encryption unit 103b encrypts the cleartext block, using a block cipher that uses the secret key as a primitive. The second encryption unit 105b generates a tag, using a block cipher that uses the secret key as a primitive.

The authentication encryption device and the authentication decryption device in the second example embodiment have the same effects as those of the authentication encryption device in the first example embodiment and the authentication decryption device in the first example embodiment, and the effects are attained for the same reason. Compared to OCB, which is an existing mode, the security is not impaired, and, also in terms of efficiency related to the encryption/decryption processing, the present technique is more efficient, since the mask calculation by means of a special element (triple multiplication in OCB) is not required and the mask can be calculated only by calculating the primitive element (only double multiplication). In addition, generally speaking, in authenticated encryption, in the constituent corresponding to the second encryption unit, it is necessary to classify the tweak of a tweakable block cipher depending on whether the final block M[m] of the cleartext has undergone a padding process. In the second example embodiment, a function corresponding to classifying is realized by taking the input of the final block to the tweakable block cipher as len(M[m]) and encrypting the length information.

Third Example Embodiment

In a third example embodiment, an example of a case will be described where a keyless cryptographic permutation is used as a primitive, XPX is used in cleartext encryption, and XP is used in encryption for tag generation. In the third example embodiment, the tag length is n/2 bits or less.

Keyless cryptographic permutation is a technique for permutating a cleartext with a ciphertext without the need for sharing a key between encryption and decryption. OPP (Offset Public Permutation) that uses TEM (Tweakable Even-Mansour) can be taken as an example of the rate 1 technique that uses a keyless cryptographic permutation for a primitive. For example, OPP that uses TEM is disclosed in Non-Patent Document 1 mentioned above.

Use of a block cipher in which a secret key is fixed as a keyless cryptographic permutation can be taken as an example of the keyless cryptographic permutation. For example, the key of a block cipher AES may preliminarily be determined and fixed as Ok (k is a positive integer), and it may be made publicly known.

Alternatively, as another example of the keyless cryptographic permutation, the permutation used in the hash function SHA-3 can directly be used as a keyless cryptographic permutation.

However, the keyless cryptographic permutation used by the authenticated encryption system of the third example embodiment is not limited to these examples.

[Description of Authentication Encryption Device Configuration]

Figure 9:
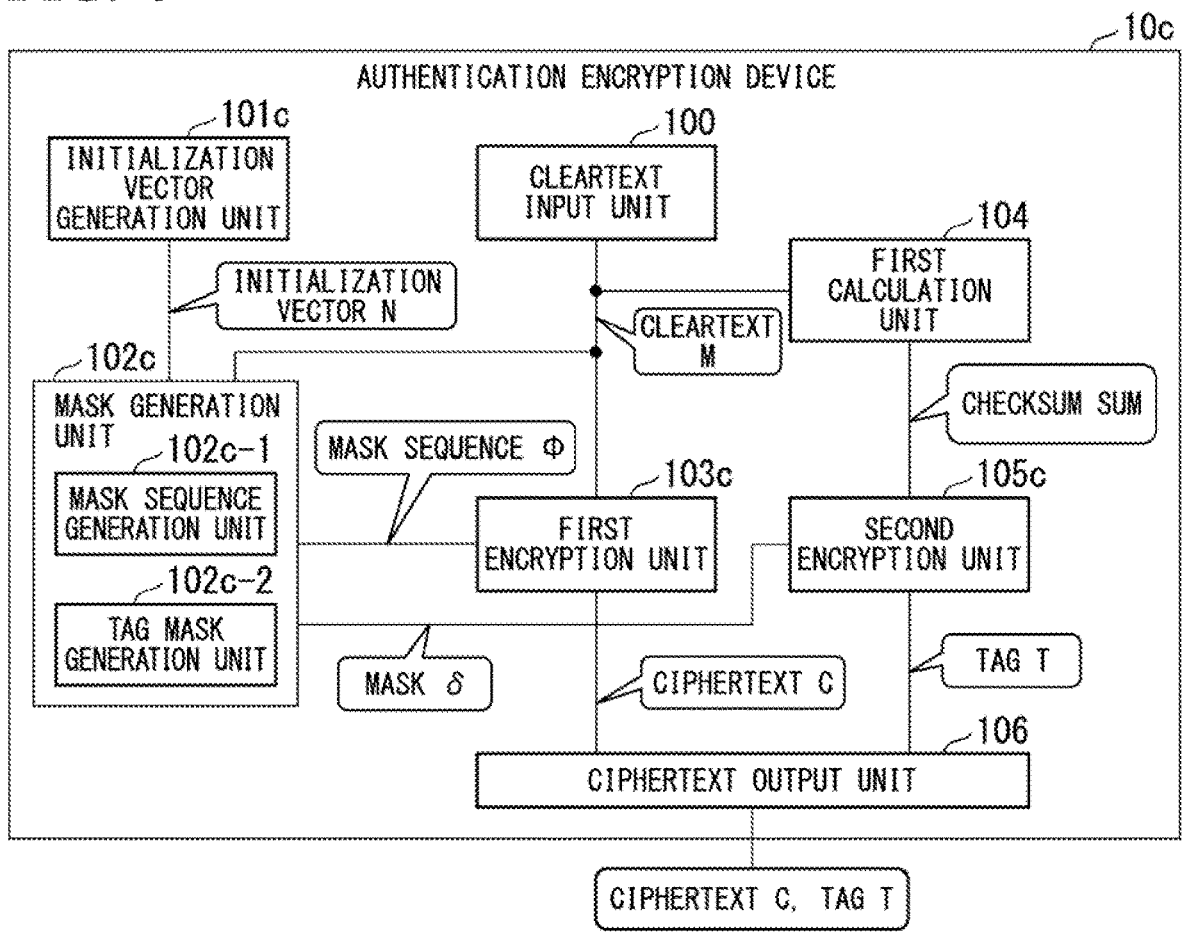
FIG. 9 is a block diagram showing a configuration example of an authentication encryption device according to a third example embodiment.

FIG. 9 is a block diagram showing a configuration example of an authentication encryption device according to a third example embodiment. As shown in FIG. 9, an authentication encryption device 10c includes a cleartext input unit 100, an initialization vector generation unit 101c, a mask generation unit 102c, a first encryption unit 103c, a first calculation unit 104, a second encryption unit 105c, and a ciphertext output unit 106. The mask generation unit 102c includes a mask sequence generation unit 102c-1 and a tag mask generation unit 102c-2.

Of the constituents shown in FIG. 9, ones corresponding to those in FIG. 2 and having similar functions are given the same reference symbols (100, 104, and 106), and descriptions thereof are omitted. In the authentication encryption device 10b, the computations performed by each of the initialization vector generation unit 101c, the mask generation unit 102c, the first encryption unit 103c, and the second encryption unit 105c are different from those in the case of the authentication encryption device 10 (FIG. 2). In other respects, the authentication encryption device 10c is similar to the authentication encryption device 10.

The authentication encryption device 10c and the authentication decryption device 20c in the third example embodiment embody the authentication encryption device 10 and the authentication decryption device 20 of the first example embodiment, and can be applied to the OPP.

The initialization vector generation unit 101c generates an initialization vector different from values generated previously. When the input/output length of the primitive used by the initialization vector generation unit 101c is n bits and the key length of the secret key is k bits, the bit length of the initialization vector N may be n−k-bit data. In the case where the initialization vector N is shorter than n−k bits, the initialization vector generation unit 101c performs padding so that the initialization vector N becomes n−k-bit data.

The mask generation unit 102c calculates and outputs the mask sequence $\Phi$ on the basis of Equation (11) mentioned above. As mentioned above, $\sigma$ indicates a primitive element of the multiplicative group of a Galois field.

On the other hand, $\Delta$ is expressed as Equation (21) in the third example embodiment.

[Equation 21]

$$\Delta = P(K\|N) \oplus K\|N \qquad (21)$$

A∥B indicates that character strings A and B are combined. N indicates the initialization vector output by the initialization vector generation unit 101c. K indicates a secret key. P indicates a keyless cryptographic permutation.

The mask sequence generation unit 102c-1 of the mask generation unit 102c generates a mask sequence $\Phi$.

Moreover, the mask generation unit 102c calculates and outputs a mask $\delta$ on the basis of Equation (12) mentioned above.

The tag mask generation unit 102c-2 of the mask generation unit 102c generates a mask $\delta$.

The first encryption unit 103c encrypts the cleartext M output by the cleartext input unit 100, using the mask sequence Φ output by the mask generation unit 102c.

In the third example embodiment, as with the case of the second example embodiment, the cleartext M output by the cleartext input unit 100 is represented as a concatenation of m−1 n-bit blocks M[1], M[2], . . . , M[m] and an n'-bit block M[m] where n'≤n. The first encryption unit 103c encrypts M[i] where 1≤i≤m, using the element Φ(i) of the mask sequence Φ. For encryption, the first encryption unit 103c uses a tweakable block cipher realized by computing an exclusive OR with use of a mask value, in the inputting and outputting of the keyless cryptographic permutation of the n-bit input/output.

The first encryption unit 103c then obtains C[i], which is the encryption result of M[i], and generates a ciphertext C that is composed of m−1 n-bit blocks C[1], C[2], . . . , C[m−1] and an n'-bit block C[m] where n'≤n. For example, as in Equation (22), the first encryption unit 103c encrypts M[i] where 1≤i<m, using a keyless cryptographic permutation P and the mask value Φ(i).

[Equation 22]

$$C[i] = P(\Phi(i) \oplus M[i]) \oplus \Phi(i) \tag{22}$$

Next, the first encryption unit 103c encrypts M[m] as in Equation (18) mentioned above.

Here, in the third example embodiment, Pad$_n$ is expressed as Equation (23), using an n-bit fixed value Fix and a mask value Φ(m).

[Equation 23]

$$Pad_n = P(\Phi(m) \oplus Fix) \oplus \Phi(m) \tag{23}$$

The second encryption unit 105c encrypts the checksum SUM output by the first calculation unit 104, using the mask δ output by the mask generation unit 102c. For encrypting the checksum SUM, the second encryption unit 105c uses a tweakable block cipher realized by computing an exclusive OR with use of a mask value, only in the inputting of the keyless cryptographic permutation of the n-bit input/output. The second encryption unit 105c encrypts the checksum SUM as in Equation (24).

[Equation 24]

$$Tag_n = P(\delta \oplus SUM) \tag{24}$$

The second encryption unit 105c divides the obtained n-bit value Tag$_n$ into two n/2-bit values Tag1 and Tag2 by means of an appropriate division function. The second encryption unit 105c generates a tag T having an n/2-bit value, with T=Tag1 when n'=n, and T=Tag2 when n'≠n. For example, the division function may be given by Equation (25) when n'=n.

[Equation 25]

$$T = Tag1 = msb_{\frac{n}{2}}(Tag_n) \tag{25}$$

msb$_{n/2}$(•) is a function that outputs the upper n/2 bits.
The division function may be given by Equation (26) when n'≠n.

[Equation 26]

$$T = Tag2 = lsb_{\frac{n}{2}}(Tag_n) \tag{26}$$

lsb$_{n/2}$(•) is a function that outputs the lower n/2 bits.

Figure 10:
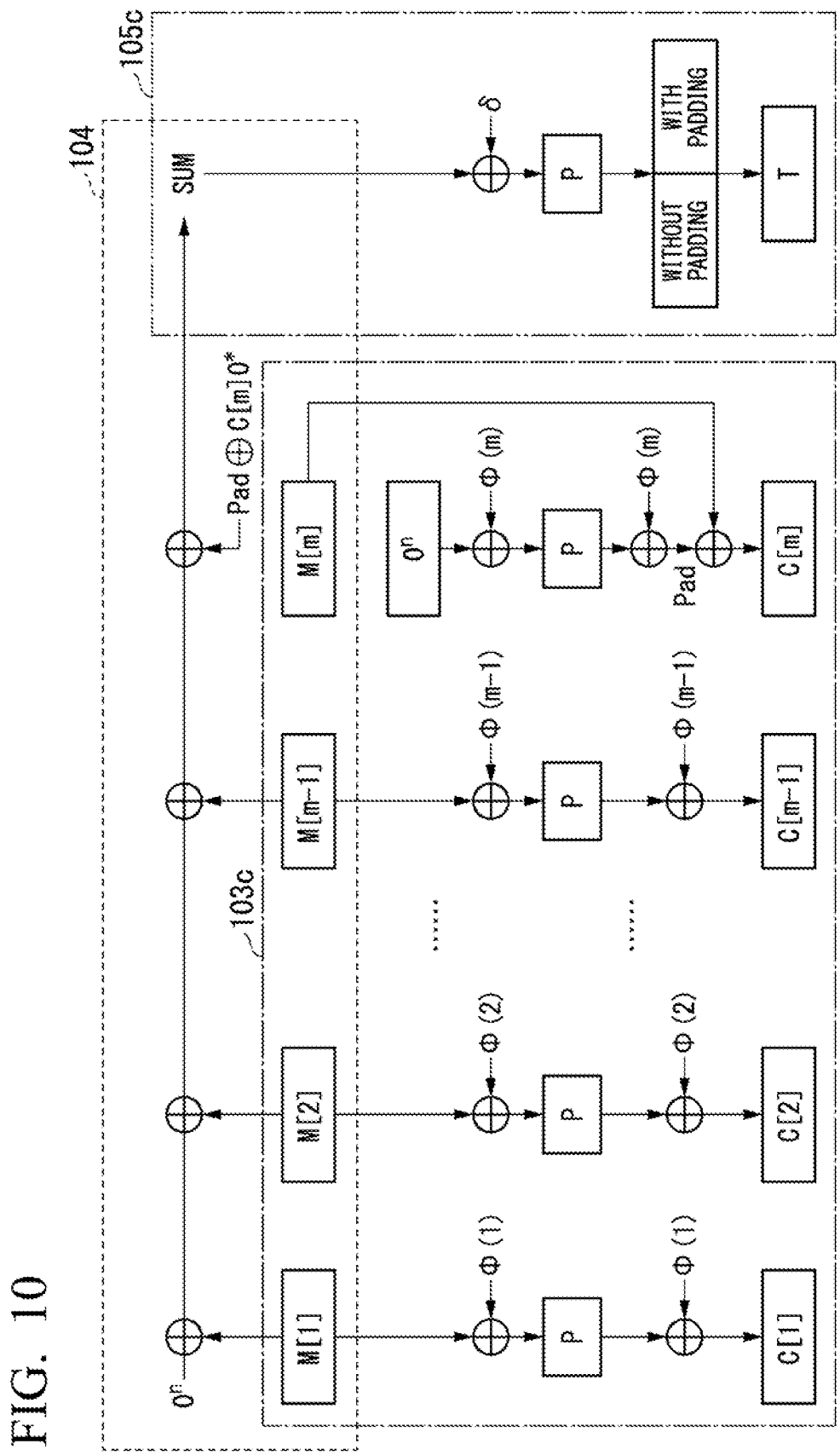
FIG. 10 is a diagram schematically showing an example of an encryption computation performed by the authentication encryption device according to the third example embodiment.

FIG. 10 is a diagram schematically showing an example of an encryption computation performed by the authentication encryption device 10c. FIG. 10 schematically shows an example of computations performed by the first encryption unit 103c, the first calculation unit 104, and the second encryption unit 105c.

As described above, the first encryption unit 103c encrypts M[i] where 1≤i<m as in Equation (22) mentioned above.

"P" indicates a keyless cryptographic permutation.

As described above in the description of the authentication encryption device 10, the first calculation unit 104 calculates the exclusive OR of all cleartext blocks as a checksum SUM. If the final block is less than n bits, the first calculation unit 104 applies appropriate padding to the final block and then calculates the exclusive OR.

"0n" indicates n-bit data in which the value of each of all bits is "0". "Pad XOR C[m]0*" indicates the exclusive OR of C[m] padded by a bit value "0" and Pad.

As described above, the second encryption unit 105c encrypts the checksum SUM as in Equation (24), and applies a division function such as Equation (25) or Equation (26) to the obtained Tag$_n$ to thereby generate the tag T.

"Without padding" indicates the division function in the case where the final cleartext block M[m] is n bits. "With padding" indicates the division function in the case where the final cleartext block M[m] is less than n bits.

[Description of Authentication Decryption Device Configuration]

Figure 11:
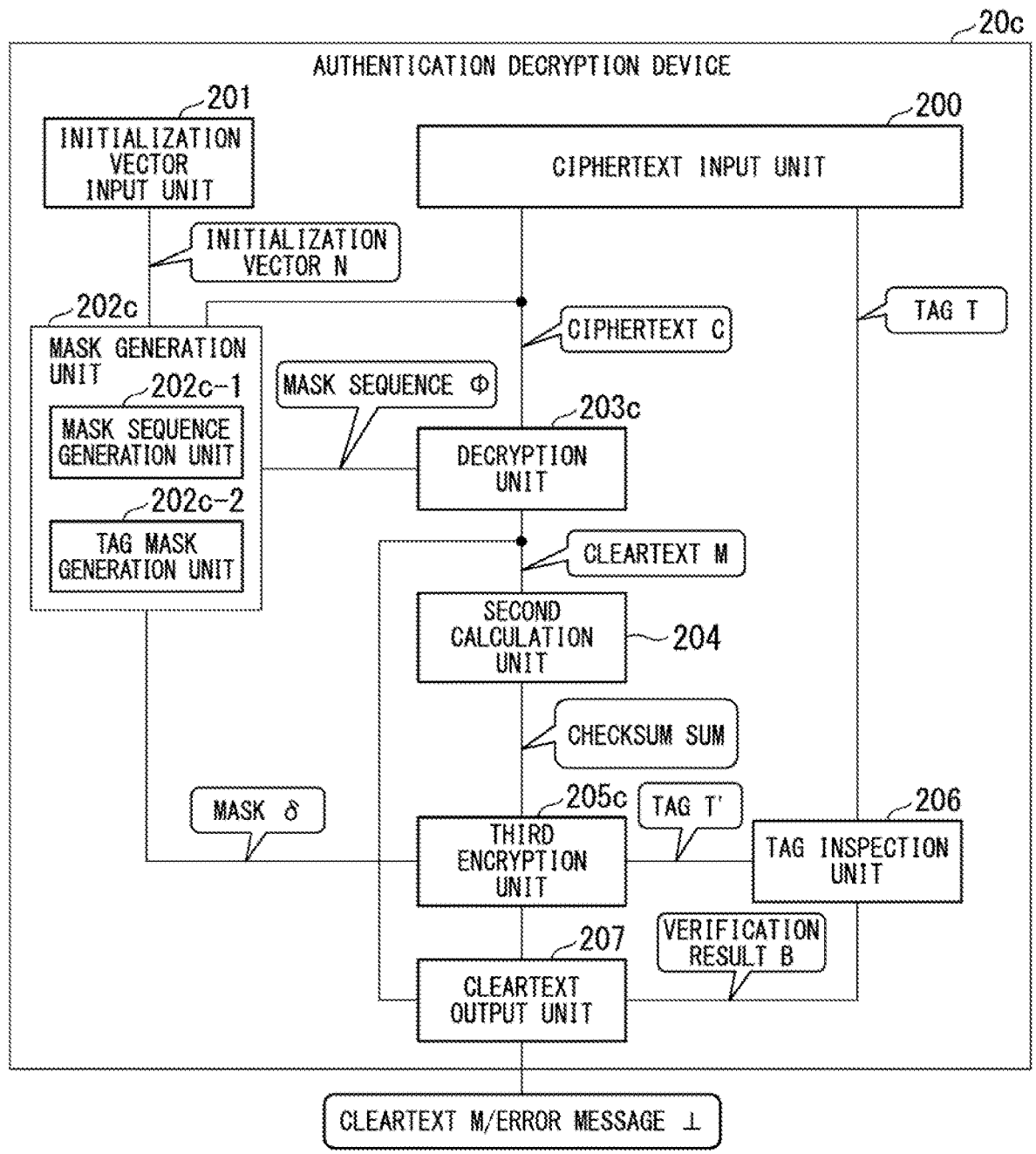
FIG. 11 is a block diagram showing a configuration example of an authentication decryption device according to the third example embodiment.

FIG. 11 is a block diagram showing a configuration example of an authentication decryption device according to the third example embodiment. As shown in FIG. 11, the authentication decryption device 20c includes a ciphertext input unit 200, an initialization vector input unit 201, a mask generation unit 202c, a decryption unit 203c, a second calculation unit 204, a third encryption unit 205c, a tag inspection unit 206, and a cleartext output unit 207. The mask generation unit 202c includes a mask sequence generation unit 202c-1 and a tag mask generation unit 202c-2.

Of the constituents shown in FIG. 11, ones corresponding to those in FIG. 4 and having similar functions are given the same reference symbols (200, 201, 204, 206, and 207), and descriptions thereof are omitted. In the authentication decryption device 20c, the computations performed by each of the mask generation unit 202c, the decryption unit 203c, and the third encryption unit 205c are different from those in the case of the authentication decryption device 20 (FIG. 4). In other respects, the authentication decryption device 20b is similar to the authentication decryption device 20.

The mask generation unit 202c is the same as the mask generation unit 102c in the authentication encryption device 10c (FIG. 9). The mask sequence generation unit 202c-1 is the same as the mask sequence generation unit 102c-1. The tag mask generation unit 202c-2 is the same as the tag mask generation unit 102c-2.

The decryption unit 203c performs decryption by means of the inverse computation of the encryption performed by the first encryption unit 103c.

The third encryption unit 205c is the same as the second encryption unit 105c.

The third encryption unit 205c corresponds to an example of a tag generation means.

Description of Effect

As described above, the mask sequence generation unit 102c-1 generates the mask sequence, using a basic mask obtained by taking an exclusive OR of a keyless cryptographic permutation of a combination of the secret key and the initialization vector and the combination of the secret key and the initialization vector. The tag mask generation unit 102c-2 generates a mask for tag generation, using the basic mask. The first encryption unit 103c encrypts a cleartext block, using a keyless cryptographic permutation as a primitive. The second encryption unit 105c generates a tag, using a keyless cryptographic permutation as a primitive.

The authentication encryption device and the authentication decryption device in the third example embodiment have the same effects as those of the authentication encryption device and the authentication decryption device in the first example embodiment, and the effects are attained for the same reason. Moreover, generally speaking, in authenticated encryption, in the constituent corresponding to the second encryption unit, it is necessary to classify the tweak of a tweakable block cipher depending on whether the final block M[m] of the cleartext has undergone a padding process. However, since the tag length is n/2 bits in the third example embodiment, classifying can be realized by using a division function in the second encryption unit of the authentication encryption device. It is more efficient to perform classifying by dividing the n bits obtained by encryption into two, than classifying of the tweak.

Fourth Example Embodiment

In the fourth example embodiment, there will be described an example in which none of the primitive, the tweakable block cipher, and the tag length are limited to particular ones. In the fourth example embodiment, for example, OCB or OPP can be used as a cleartext encryption method and an encryption method for tag generation.

[Description of Authentication Encryption Device Configuration]

Figure 12:
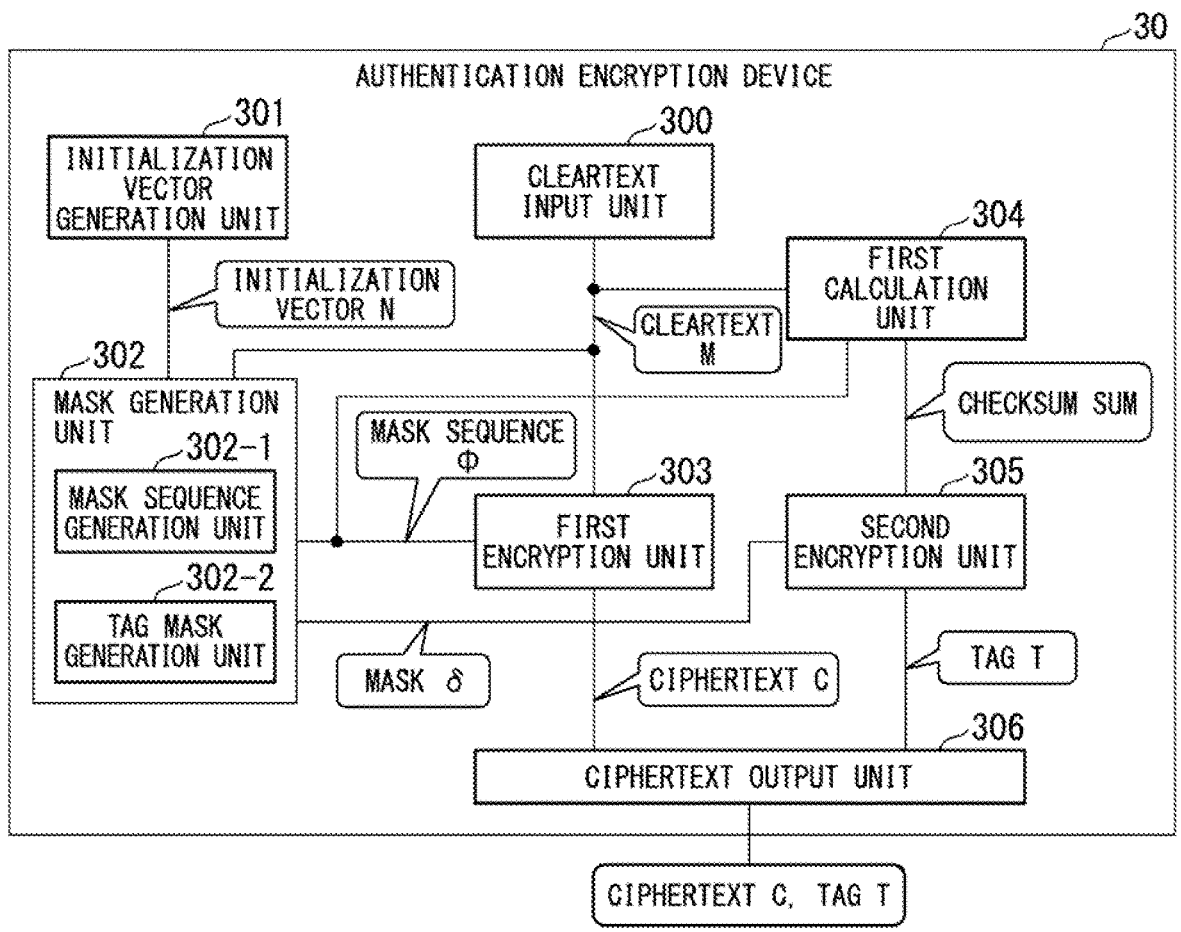
FIG. 12 is a block diagram showing a configuration example of an authentication encryption device according to a fourth example embodiment.

FIG. 12 is a block diagram showing a configuration example of an authentication encryption device according to a fourth example embodiment. As shown in FIG. 12, an authentication encryption device 30 includes a cleartext input unit 300, an initialization vector generation unit 301, a mask generation unit 302, a first encryption unit 303, a first calculation unit 304, a second encryption unit 305, and a ciphertext output unit 306. The mask generation unit 302 includes a mask sequence generation unit 302-1 and a tag mask generation unit 302-2.

The cleartext input unit 300 accepts an input of a cleartext M to be encrypted. Where the input/output length of the primitive to be used is n bits, the cleartext input unit 300 accepts an input of a cleartext M composed of m−1 n-bit blocks M[1], M[2], . . . , M[m−1] where m≤n−2 and an n'-bit block M[m] where n'≤n.

The method in which the cleartext input unit 300 accepts an input of cleartext M is not limited to a particular method. For example, the cleartext input unit 300 may include a character input device such as a keyboard so as to accept a user operation for inputting a cleartext M. Alternatively, the cleartext input unit 300 may receive a cleartext M from another device.

The initialization vector generation unit 301 generates an initialization vector different from values generated previously. The initialization vector generation unit 301 is the same as the initialization vector generation unit 101 in the authentication encryption device 10 (FIG. 2).

The mask generation unit 302 outputs the mask sequence Φ and the mask δ generated by exponentiating the primitive element of the multiplicative group of the Galois field, using the cleartext M output by the cleartext input unit 300, the initialization vector N output by the initialization vector generation unit 301, and the secret key K. The mask generation unit 302 is the same as the mask sequence generation unit 102. The mask sequence generation unit 302-1 is the same as the mask sequence generation unit 102-1. The tag mask generation unit 302-2 is the same as the tag mask generation unit 102-2.

For example, a basic mask value Δ can be realized as follows. In the case where the primitive used is a block cipher E, the Δ can be represented as Equation (10) mentioned above.

In the case where the primitive used is a keyless cryptographic permutation P, the Δ can be represented as Equation (21) mentioned above.

The mask sequence generation unit 302-1 corresponds to an example of a mask sequence generation means. The tag mask generation unit 102-2 corresponds to an example of a tag mask generation means.

The first encryption unit 303 encrypts the cleartext M output by the cleartext input unit 300, using the mask sequence Φ output by the mask generation unit 302. The first encryption unit 303 is the same as the first encryption unit 103.

The first encryption unit 303 corresponds to an example of a first encryption means.

The first calculation unit 304 calculates an n-bit checksum SUM from the cleartext M output by the cleartext input unit 300 and the mask sequence Φ output by the mask generation unit 302, by means of an exclusive OR. That is to say, the checksum SUM is expressed as Equation (27).

[Equation 27]

$$SUM = M[1] \oplus M[2] \oplus \ldots \oplus M[m] \oplus \Phi(1) \oplus \Phi(2) \oplus \ldots \oplus \Phi(m) \quad (27)$$

If the final cleartext block is less than n bits, appropriate padding may be applied to the final block and then calculate an exclusive OR.

The first calculation unit 304 corresponds to an example of a checksum calculation means.

The second encryption unit 305 encrypts SUM output by the first calculation unit 304, using the mask δ output by the mask generation unit 302. At this time, for encrypting the SUM, the third encryption unit 205 uses a tweakable block cipher TE realized by computing an exclusive OR with use of a mask value, at least in the inputting among the primitive inputting and outputting of n-bit input/output. SUM is encrypted as in Equation (28).

[Equation 28]

$$Tag_n = TE(\delta, SUM) \quad (28)$$

The second encryption unit 305 converts the obtained $Tag_n$ into a t-bit value where t≤n by means of an appropriate contraction function, and generates a tag T.

The second encryption unit 305 corresponds to an example of a second encryption means.

Figure 13:
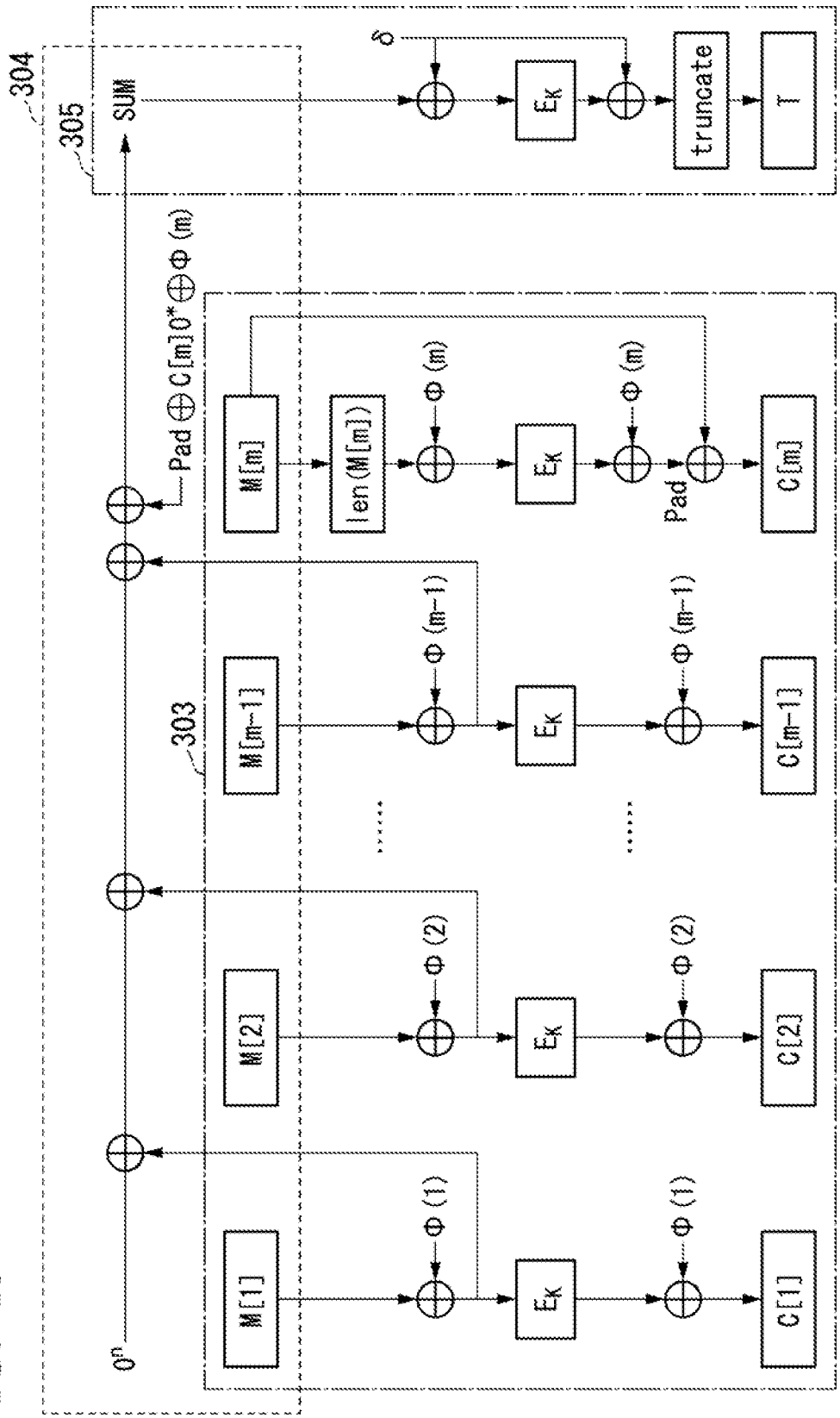
FIG. 13 is a diagram schematically showing an example of an encryption computation performed by the authentication encryption device according to the fourth example embodiment.

FIG. 13 is a diagram schematically showing an example of an encryption computation performed by the authentication encryption device 30. FIG. 13 schematically shows an example of computations performed by the first encryption unit 303, the first calculation unit 304, and the second encryption unit 305.

As described above, the first encryption unit 303 is the same as the first encryption unit 103 of the first example embodiment. The first encryption unit 303 encrypts M[i] where 1≤i<m as in Equation (13) mentioned above.

As described above, the first calculation unit 304 calculates a checksum SUM on the basis of Equation (27). If the final block M[m] is less than n bits, the first calculation unit 104 applies appropriate padding to the final block, and, after having taken the exclusive OR thereof with Φ(m), takes the exclusive OR with the computation result on the basis of M[1] to M[m−1].

As described above, the second encryption unit 305 encrypts SUM as in Equation (28). At this time, as described above, for encrypting SUM, the second encryption unit 305 uses a tweakable block cipher TE realized by computing an exclusive OR with use of a mask value, at least in inputting among the primitive inputting and outputting. FIG. 13 shows an example of a case where the second encryption unit 305 performs an exclusive OR computation in both inputting and outputting of the primitive.

Figure 14:
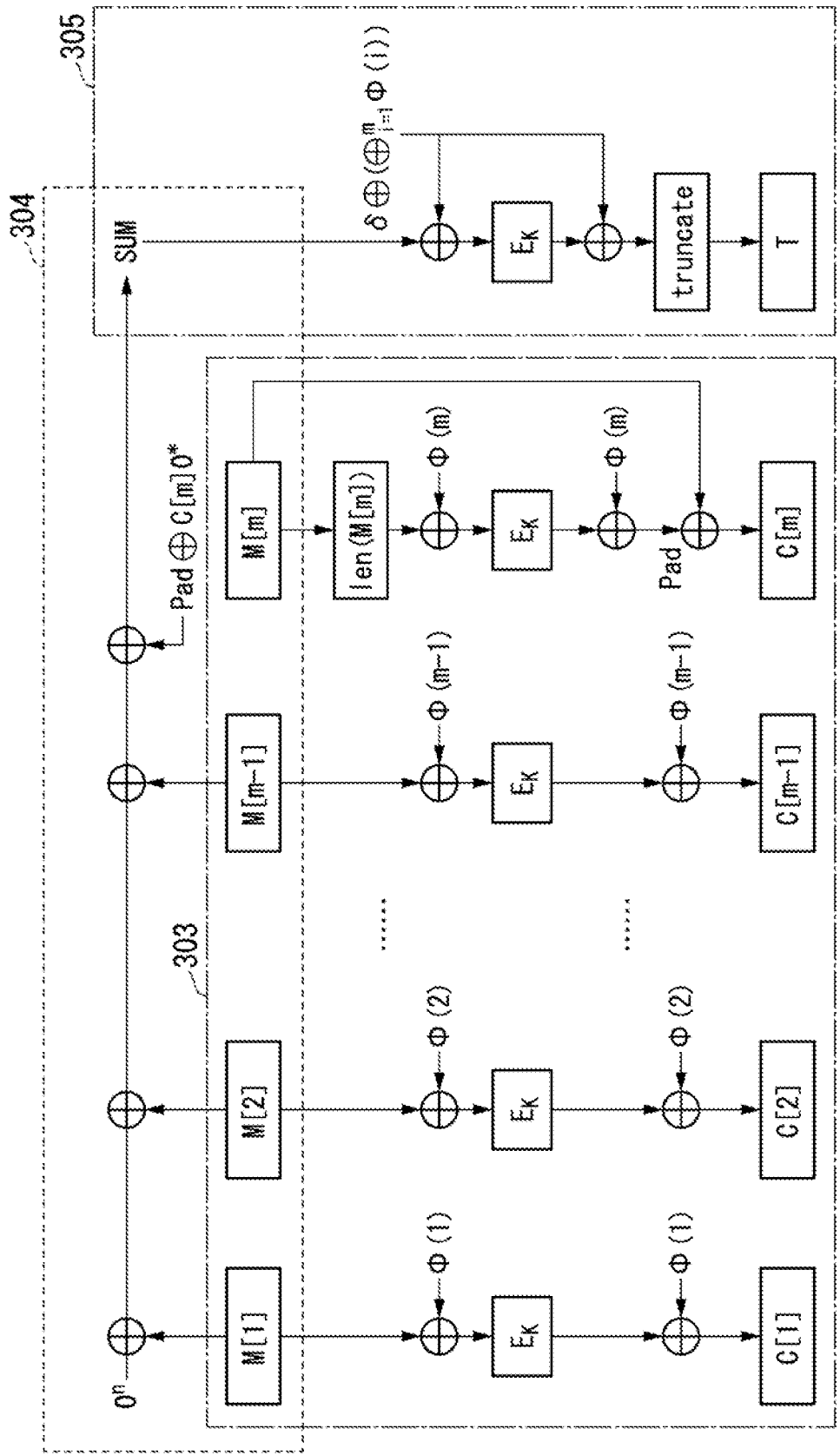
FIG. 14 is a diagram schematically showing a modified example of the encryption computation performed by the authentication encryption device according to the fourth example embodiment.

It is a diagram schematically showing a modified example of the encryption computation performed by the authentication encryption device 30. FIG. 14 shows a modified example of the computation of FIG. 13.

In the computation of FIG. 14, in place of the first calculation unit 304 taking the exclusive OR of Φ(i) when computing the SUM, the second encryption unit 305 takes the exclusive OR of the mask δ and Φ(1) to Φ(m).

[Description of Authentication Decryption Device Configuration]

Figure 15:
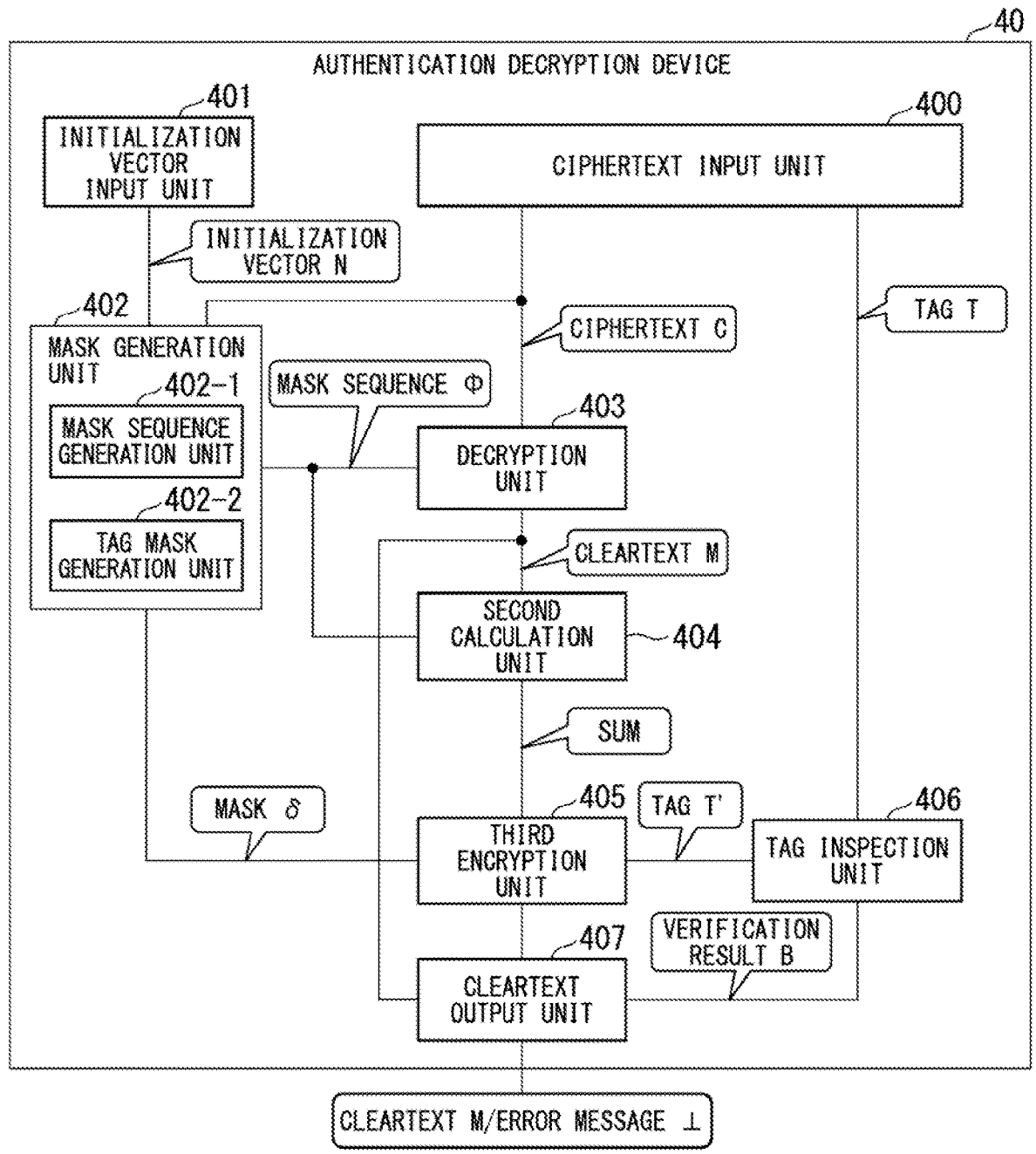
FIG. 15 is a block diagram showing a configuration example of an authentication decryption device according to the fourth example embodiment.

FIG. 15 is a block diagram showing a configuration example of an authentication decryption device according to the fourth example embodiment.

As shown in FIG. 15, the authentication decryption device 40 includes a ciphertext input unit 400, an initialization vector input unit 401, a mask generation unit 402, a decryption unit 403, a second calculation unit 404, a third encryption unit 405, a tag inspection unit 406, and a cleartext output unit 407. The mask generation unit 402 includes a mask sequence generation unit 402-1 and a tag mask generation unit 402-2.

Where the input/output length of the primitive to be used is n bits, the ciphertext input unit 300 accepts an input of a ciphertext C[m] composed of m−1 n-bit blocks c[1], c[2], . . . , c[m−1] where m≤n−2 and an n'-bit block C[m] where n'≤n. This is realized, for example, by a character input device such as a keyboard.

The initialization vector input unit 401 inputs the target initialization vector N. The initialization vector input unit 401 is the same as the initialization vector input unit 201 in the authentication decryption device of the first example embodiment.

The mask generation unit 402 outputs a mask sequence Φ and a mask δ generated by exponentiating the primitive element of the multiplicative group of the Galois field, using the ciphertext C output by the ciphertext input unit 400, the initialization vector N output by the initialization vector input unit 401, and the secret key K. The mask generation unit 402 is the same as the mask generation unit 302 in the authentication encryption device of the fourth example embodiment. The mask sequence generation unit 402-1 is the same as the mask sequence generation unit 302-1. The tag mask generation unit 402-2 is the same as the tag mask generation unit 302-2.

The mask sequence generation unit 402-1 corresponds to an example of a mask sequence generation means. The tag mask generation unit 402-2 corresponds to an example of a tag mask generation means.

The decryption unit 403 decrypts the ciphertext C output by the ciphertext input unit 400, using the mask sequence Φ output by the mask generation unit 402, and outputs the cleartext M. The decryption unit 403 is the same as the decryption unit 203 in the authentication decryption device of the first example embodiment.

The decryption unit 403 corresponds to an example of a decryption means.

The second calculation unit 404 calculates an n-bit checksum SUM from the cleartext M output by the decryption unit 403 and the mask sequence Φ output by the mask generation unit 402, by means of a simple calculation. The second calculation unit 404 is the same as the first calculation unit 304 in the fourth example embodiment.

The second calculation unit 404 corresponds to an example of a checksum calculation means.

The third encryption unit 405 encrypts SUM output by the second calculation unit 404, using the mask δ output by the mask generation unit 402, and outputs a tag T'. The third encryption unit 405 is the same as the second encryption unit 305 in the authentication encryption device of the fourth example embodiment.

The third encryption unit 405 corresponds to an example of a tag generation means.

The tag inspection unit 406 compares the tag T output by the ciphertext input unit 400 and the tag T' output by the third encryption unit 405 with each other. B=ACK is set if T and T' match with each other whereas B=NCK is set if they do not match with each other, and the verification result B is output. The tag inspection unit 406 is the same as the tag inspection unit 206 in the authentication decryption device of the first example embodiment.

The tag inspection unit 406 corresponds to an example of a tag inspection means.

The cleartext output unit 407 takes an input of the cleartext M output by the decryption unit 403 and an input of the verification result B output by the tag inspection unit 406, and outputs the cleartext M if B=ACK, and outputs an error message ⊥ to a computer display, a printer or the like if B=NCK. The cleartext output unit 407 is the same as the cleartext output unit 207 in the authentication decryption device of the first example embodiment.

Description of Effect

As described above, the first calculation unit 304 calculates the checksum by means of an exclusive OR of each of the cleartext blocks and each of the elements of the mask sequence.

The authentication encryption device and the authentication decryption device in the fourth example embodiment have the same effects as those of the authentication encryption device and the authentication decryption device in the first example embodiment. However, the reason why these effects are attained differs from those of the first example embodiment and the second example embodiment, and the reason will be described below. In the first example embodiment, it is possible to decide the special mask without defining the special element, by changing the security certification method used in the existing mode. In the present example embodiment, security can still be certified by limiting the amount of data to be processed while no changes are made to the security certification method used in the existing mode. When the primitive element of a Galois field $GF(2^n)$ is σ, according to the safety certification method used in the existing mode, security can be certified as long as the mask function defined by Equation (29) is injective.

[Equation 29]

$$\text{Mask}:\{1,2,\ldots,n-2\}\times\{0,1\}\rightarrow(GF(2^n)) \quad (29)$$

The mask used in the cleartext processing is expressed as Equation (30).

[Equation 30]

$$\text{Mask}(i,0) = \sigma^i \quad (30)$$

The mask used in the tag generation processing is expressed as Equation (31).

[Equation 31]

$$\text{Mask}(i,1) = \sigma^1 \oplus \sigma^2 \oplus \ldots \oplus \sigma^i \oplus \sigma^{i+1} \quad (31)$$

Here, $(GF(2^n))^*$ represents a multiplicative group of $GF(2^n)$. Here, the basis of the multiplicative group may be represented as Equation (32) according to the definition of the Galois field.

[Equation 32]

$$(GF(2^n))^* = \langle 1, \sigma^1, \sigma^2, \ldots, \sigma^{n-1} \rangle \quad (32)$$

In other words, an element of arbitrary $(GF(2\char`\^n))^*$ can be expressed by the linear sum of $1, \sigma^1, \sigma^2, \ldots, \sigma^{n-1}$. For this reason, the above mask function can be easily identified as injective.

As with the mask function mentioned above, in the present example embodiment, the mask value $\Phi(i) = \sigma^i$ is used in the cleartext processing block, that is, the first encryption unit in the authentication encryption device and the decryption unit in the authentication decryption device. On the other hand, the mask value $\delta = \sigma^{m+1}$ is used in the tag generation block, that is, the second encryption unit in the authentication encryption device and the third encryption unit in the authentication decryption device, and this seemingly appears to be different from the mask function mentioned above.

However, in the first calculation unit in the authentication encryption device and the second calculation unit in the authentication decryption device, the checksum SUM is calculated so as to include the exclusive OR of all elements of the mask sequence D. Since an exclusive OR is commutative, the mask value used in the tag generation block in the present example embodiment can be expressed as Equation (33).

[Equation 33]

$$\Phi(1) \oplus \Phi(2) \oplus \ldots \oplus \Phi(m) \oplus \delta = \sigma^1 \oplus \sigma^2 \oplus \ldots \oplus \sigma^m \oplus \sigma^{m+1} \quad (33)$$

That is to say, the mask used in the present example embodiment can be viewed as the same as the mask function of Equation (29) mentioned above. As a result, the present example embodiment can be certified as being secure as an authenticated encryption. In other words, injectivity of the mask function to be used can only be certified by solving the discrete logarithm problem over a finite field in the existing mode. By contrast, in the present example embodiment, by limiting the domain of the mask function definition, it is possible to easily indicate the injectivity of a mask function mathematically without solving the discrete logarithm problem over a finite field.

Moreover, as with the second and third example embodiments, the security is not impaired as compared with the existing modes such as OCB and OPP. In terms of efficiency related to encryption/decryption processing, the authentication encryption device and the authentication decryption device in the fourth example embodiment use all masks used in the cleartext processing when generating a tag, referring only to the mask function. As a result, the memory size (called state size) used for encryption/decryption processing may seem to increase.

However, as described in the example of FIG. 9 and the description of the configuration of the fourth example embodiment, when calculating SUM, the exclusive OR is performed on the mask value along with cleartext blocks, and therefore, the state size does not change from that of the existing modes. Since the mask calculation by means of a special element (triple multiplication in OCB) is not required and the mask can be calculated only by calculating the primitive element (only double multiplication), it can be said that the present mode is more efficient than the existing modes.

Fifth Example Embodiment

Figure 16:
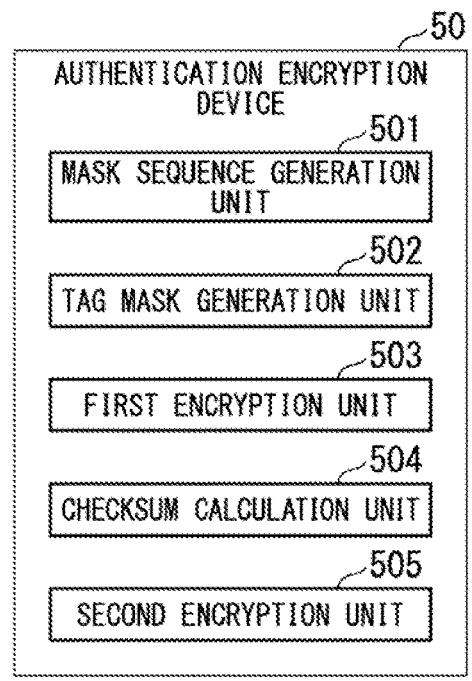
FIG. 16 is a diagram showing a configuration example of an authentication encryption device according to a fifth example embodiment.

FIG. 16 is a diagram showing a configuration example of an authentication encryption device according to a fifth example embodiment. As shown in FIG. 16, an authentication encryption device 50 includes a mask sequence generation unit 501, a tag mask generation unit 502, a first encryption unit 503, a checksum calculation unit 504, and a second encryption unit 505.

The mask sequence generation unit 501 corresponds to an example of a mask sequence generation means. The tag mask generation unit 502 corresponds to an example of a tag mask generation means. The first encryption unit 503 corresponds to an example of a first encryption means. The checksum calculation unit 504 corresponds to an example of a checksum calculation means. The second encryption unit 505 corresponds to an example of a second encryption means.

In this configuration, the mask sequence generation unit 501 generates a mask sequence having, as an element, multiplication, in a Galois field, of a basic mask defined on the basis of an initialization vector, a secret key, and a constant and primitive elements of a multiplicative group of the Galois field raised to the power of exponents differing per cleartext block. The tag mask generation unit 502 generates a mask for tag generation by the multiplication, in the Galois field, of the basic mask and a primitive element of the multiplicative group of the Galois field raised to the power of an exponent differing from the exponents in any of the elements in the mask sequence. The first encryption unit 503 encrypts cleartext, using a tweakable block cipher for computing exclusive OR for which the elements in the mask sequence are used respectively in primitive inputting and outputting. The checksum calculation unit 504 calculates the checksum of the cleartext, using the cleartext block. The second encryption unit 505 encrypts the checksum using the tweakable block cipher for computing exclusive OR for which the mask for tag generation is used in at least the inputting from among the primitive inputting and outputting, and generates a tag for authentication.

As a result, in the authentication encryption device 50, it is possible to generate a mask used by the second encryption unit 505 for checksum encryption, without solving a discrete logarithm problem over a finite field.

Sixth Example Embodiment

Figure 17:
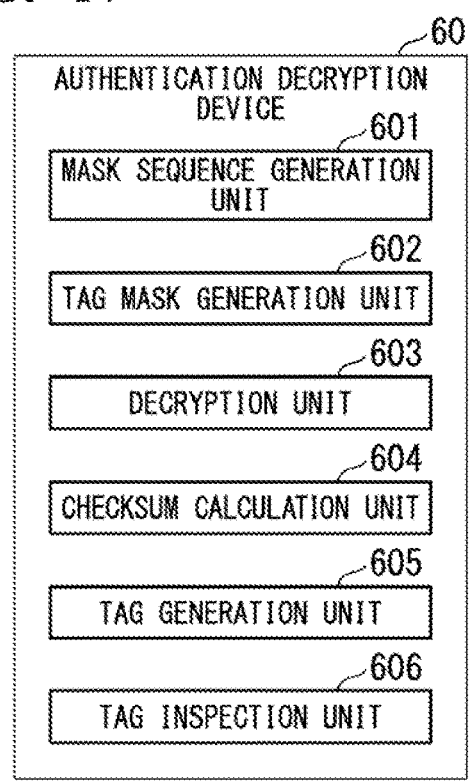
FIG. 17 is a diagram showing a configuration example of an authentication decryption device according to a sixth example embodiment.

FIG. 17 is a diagram showing a configuration example of an authentication decryption device according to a sixth example embodiment. As shown in FIG. 17, an authentication decryption device 60 includes a mask sequence generation unit 601, a tag mask generation unit 602, a decryption unit 603, a checksum calculation unit 604, a tag generation unit 605, and a tag inspection unit 606.

The mask sequence generation unit 601 corresponds to an example of a mask sequence generation means. The tag mask generation unit 602 corresponds to an example of a tag mask generation means. The decryption unit 603 corresponds to an example of a decryption means. The checksum calculation unit 604 corresponds to an example of a checksum calculation means. The tag generation unit 605 corresponds to an example of a tag generation means. The tag inspection unit 606 corresponds to an example of a tag inspection means.

In this configuration, the mask sequence generation unit 601 generates a mask sequence having, as an element, multiplication, in a Galois field, of a basic mask defined on the basis of an initialization vector, a secret key, and a constant and a primitive element of a multiplicative group of the Galois field raised to the power of exponents differing per cleartext block. The tag mask generation unit 602 generates a mask for tag generation by the multiplication, in the Galois field, of the basic mask and a primitive element of the multiplicative group of the Galois field raised to the power of an exponent differing from the exponents in any of the elements in the mask sequence. The decryption unit 603 decrypts a cipher block into a cleartext block, using a tweakable block cipher for computing exclusive OR for which the elements in the mask sequence are used respectively in inputting and outputting of a decryption function. The checksum calculation unit 604 calculates the checksum of the cleartext, using the cleartext block. The tag generation unit 605 encrypts the checksum using a tweakable block cipher for computing exclusive OR for which the mask for tag generation is used in at least the inputting from among the inputting and outputting of an encryption function, which is a reciprocal function of the decryption function, and generates a tag for authentication.

The tag inspection unit 606 uses the tag to decide whether to accept or not to accept the result of decryption performed by the decryption unit.

As a result, in the authentication decryption device 60, it is possible to generate a mask used by the tag generation unit 605 for checksum encryption, without solving a discrete logarithm problem over a finite field.

Seventh Example Embodiment

Figure 18:
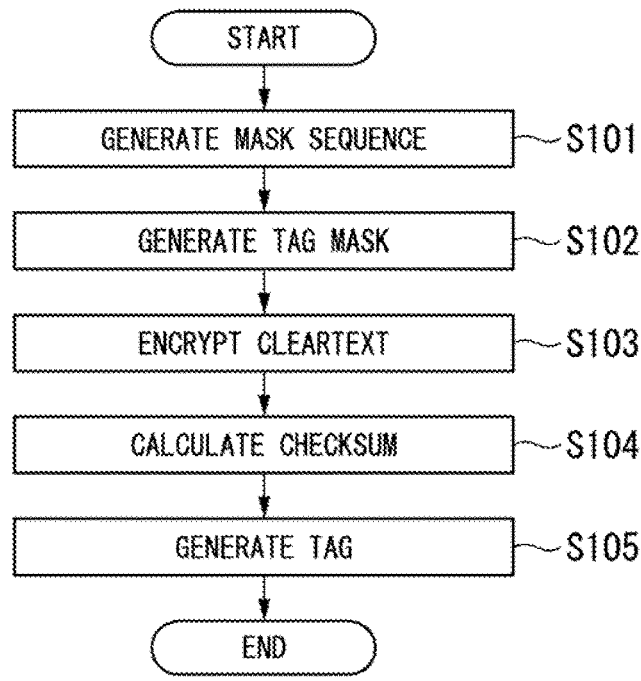
FIG. 18 is a flowchart showing an example of a processing procedure in an authentication encryption method according to a seventh example embodiment.

FIG. 18 is a flowchart showing an example of a processing procedure in an authentication encryption method according to a seventh example embodiment.

The authentication encryption method of FIG. 18 includes a mask sequence generation step (Step S101), a tag mask generation step (Step S102), a cleartext encryption step (Step S103), a checksum calculation step (Step S104), and a tag generation step (Step S105).

In the mask sequence generation step (Step S101), there is generated a mask sequence having, as an element, multiplication, in a Galois field, of a basic mask defined on the basis of an initialization vector, a secret key, and a constant and primitive elements of a multiplicative group of the Galois field raised to the power of exponents differing per cleartext block. In the tag mask generation step (Step S102), there is generated a mask for tag generation by the multiplication, in the Galois field, of the basic mask and a primitive element of the multiplicative group of the Galois field raised to the power of an exponent differing from the exponents in any of the elements in the mask sequence. In the cleartext encryption step (Step S103), the cleartext is encrypted, using a tweakable block cipher for computing exclusive OR for which the elements in the mask sequence are used respectively in primitive inputting and outputting. In the checksum calculation step (Step S104), the checksum of the cleartext is calculated, using the cleartext block. In the tag generation step (Step S105), the checksum is encrypted using the tweakable block cipher for computing exclusive OR for which the mask for tag generation is used in at least the inputting from among the primitive inputting and outputting, and a tag for authentication is generated.

According to the authentication encryption method of FIG. 18, it is possible to generate a mask used for checksum encryption without solving a discrete logarithm problem over a finite field.

Eighth Example Embodiment

Figure 19:
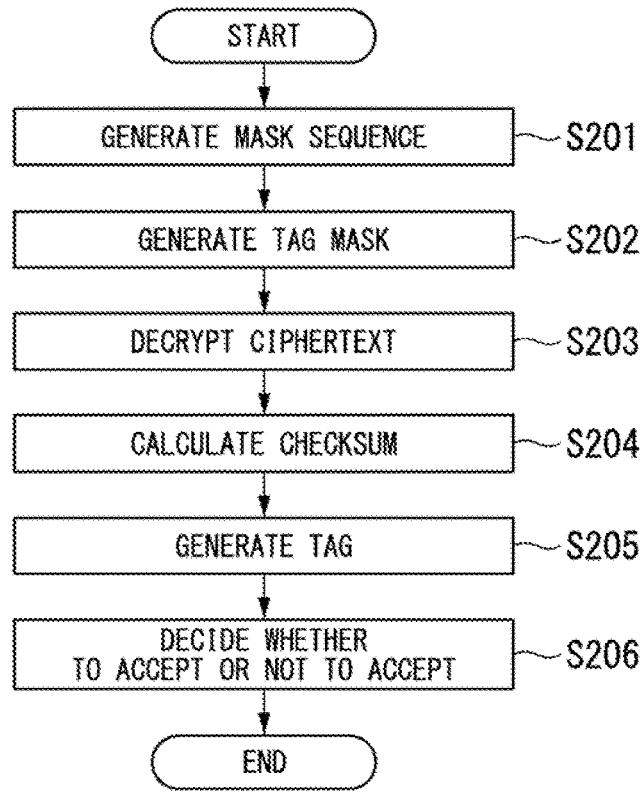
FIG. 19 is a flowchart showing an example of a processing procedure in an authentication decryption method according to an eighth example embodiment.

FIG. 19 is a flowchart showing an example of a processing procedure in an authentication decryption method according to an eighth example embodiment.

The authentication decryption method of FIG. 19 includes a mask sequence generation step (Step S201), a tag mask generation step (Step S202), a ciphertext decryption step (Step S203), a checksum calculation step (Step S204), a tag generation step (Step S205), and a tag inspection step (Step S206).

In the mask sequence generation step (Step S201), there is generated a mask sequence having, as an element, multiplication, in a Galois field, of a basic mask defined on the basis of an initialization vector, a secret key, and a constant and primitive elements of a multiplicative group of the Galois field raised to the power of exponents differing per cleartext block. In the tag mask generation step (Step S202), there is generated a mask for tag generation by the multiplication, in the Galois field, of the basic mask and a primitive element of the multiplicative group of the Galois field raised to the power of an exponent differing from the exponents in any of the elements in the mask sequence. In the ciphertext decryption step (Step S203), a cipher block is decrypted into a cleartext block, using a tweakable block cipher for computing exclusive OR for which the elements in the mask sequence are used respectively in inputting and outputting of a decryption function. In the checksum calculation step (Step S204), the checksum of the cleartext is calculated, using the cleartext block. In the tag generation step (Step S205), the checksum is encrypted using a tweakable block cipher for computing exclusive OR for which the mask for tag generation is used in at least the inputting from among the inputting and outputting of an encryption function, which is a reciprocal function of the decryption function, and a tag for authentication is generated. In the tag inspection step (Step S206), the tag is used to decide whether to accept or not to accept the result of decryption.

According to the authentication decryption method of FIG. 19, it is possible to generate a mask used for checksum encryption without solving a discrete logarithm problem over a finite field.

Figure 20:
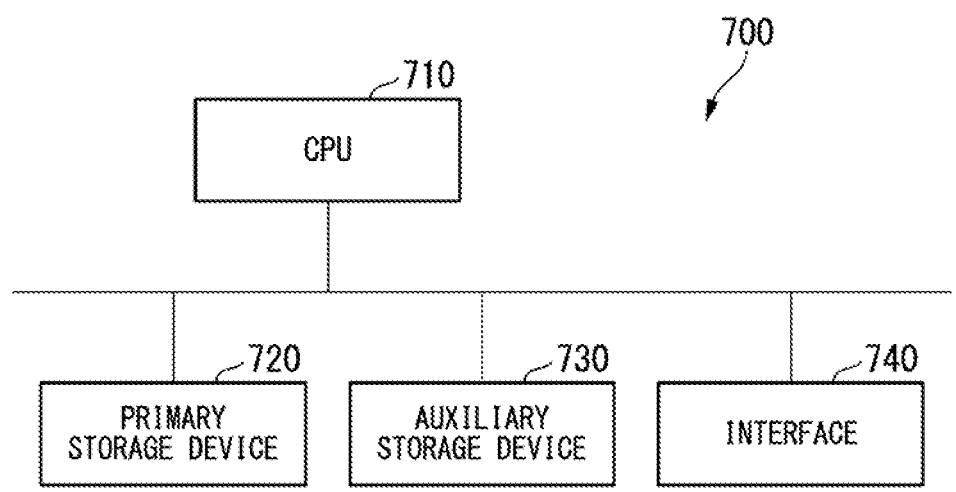
FIG. 20 is a schematic block diagram showing a configuration of a computer according to at least one of the example embodiments.

FIG. 20 is a schematic block diagram showing a configuration of a computer according to at least one example embodiment.

In the configuration shown in FIG. 20, a computer 700 includes a CPU (Central Processing Unit) 710, a primary storage device 720, an auxiliary storage device 730, and an interface 740.

One or more of the authentication encryption devices 10, 10b, 10c, 30, and 50, and the authentication decryption devices 20, 20b, 20c, 40, and 60 may be implemented in a computer 700. In such a case, operations of the respective processing units described above are stored in the auxiliary storage device 730 in the form of a program. The CPU 710 reads out the program from the auxiliary storage device 730, loads it on the primary storage device 720, and executes the processing described above according to the program. Moreover, the CPU 710 secures, according to the program, storage regions corresponding to the respective storage units mentioned above, in the primary storage device 720.

In the case where the authentication encryption device 10 is implemented in the computer 700, operations of the initialization vector generation unit 101, the mask generation unit 102, the first encryption unit 103, the first calculation unit 104, and the second encryption unit 105 are stored in the auxiliary storage device 730 in the form of a program. The CPU 710 reads out the program from the auxiliary storage device 730, loads it on the primary storage device 720, and executes the operation of each unit according to the program.

Cleartext input acceptance performed by the cleartext input unit 100 is executed by the interface 740 having, for example, a communication function or an input function such as a user operation accepting function, and performing an input process under the control of the CPU 710.

Output of ciphertexts and tags performed by the ciphertext output unit 106 is executed by the interface 740 having, for example, a communication function or an output function such as a displaying function, and performing an output process under the control of the CPU 710.

In the case where the authentication encryption device 10b is implemented in the computer 700, operations of the initialization vector generation unit 101, the mask generation unit 102b, the first encryption unit 103b, the first calculation unit 104, and the second encryption unit 105b are stored in the auxiliary storage device 730 in the form of a program. The CPU 710 reads out the program from the auxiliary storage device 730, loads it on the primary storage device 720, and executes the operation of each unit according to the program.

Cleartext input acceptance performed by the cleartext input unit 100 is executed by the interface 740 having, for example, a communication function or an input function such as a user operation accepting function, and performing an input process under the control of the CPU 710.

Output of ciphertexts and tags performed by the ciphertext output unit 106 is executed by the interface 740 having, for example, a communication function or an output function such as a displaying function, and performing an output process under the control of the CPU 710.

In the case where the authentication encryption device 10c is implemented in the computer 700, operations of the initialization vector generation unit 101c, the mask generation unit 102c, the first encryption unit 103c, the first calculation unit 104, and the second encryption unit 105c are stored in the auxiliary storage device 730 in the form of a program. The CPU 710 reads out the program from the auxiliary storage device 730, loads it on the primary storage device 720, and executes the operation of each unit according to the program.

Cleartext input acceptance performed by the cleartext input unit 100 is executed by the interface 740 having, for example, a communication function or an input function such as a user operation accepting function, and performing an input process under the control of the CPU 710.

Output of ciphertexts and tags performed by the ciphertext output unit 106 is executed by the interface 740 having, for example, a communication function or an output function such as a displaying function, and performing an output process under the control of the CPU 710.

In the case where the authentication encryption device 30 is implemented in the computer 700, operations of the initialization vector generation unit 301, the mask generation unit 302, the first encryption unit 303, the first calculation unit 304, and the second encryption unit 305 are stored in the auxiliary storage device 730 in the form of a program. The CPU 710 reads out the program from the auxiliary storage device 730, loads it on the primary storage device 720, and executes the operation of each unit according to the program.

Cleartext input acceptance performed by the cleartext input unit 300 is executed by the interface 740 having, for example, a communication function or an input function such as a user operation accepting function, and performing an input process under the control of the CPU 710.

Output of ciphertexts and tags performed by the ciphertext output unit 306 is executed by the interface 740 having, for example, a communication function or an output function such as a displaying function, and performing an output process under the control of the CPU 710.

In the case where the authentication decryption device 20 is implemented in the computer 700, operations of the initialization vector input unit 201, the mask generation unit 202, the decryption unit 203, the second calculation unit 204, the third encryption unit 205, and the tag inspection unit 206 are stored in the auxiliary storage device 730 in the form of a program. The CPU 710 reads out the program from the auxiliary storage device 730, loads it on the primary storage device 720, and executes the operation of each unit according to the program.

Acceptance of ciphertext input and tag input performed by the ciphertext input unit 200 is executed by the interface 740 having, for example, a communication function or an input function such as a user operation accepting function, and performing an input process under the control of the CPU 710.

Output of cleartext or error messages performed by the cleartext output unit 207 is executed by the interface 740 having, for example, a communication function or an output function such as a displaying function, and performing an output process under the control of the CPU 710.

In the case where the authentication decryption device 20b is implemented in the computer 700, operations of the initialization vector input unit 201, the mask generation unit 202b, the decryption unit 203b, the second calculation unit 204, the third encryption unit 205b, and the tag inspection unit 206 are stored in the auxiliary storage device 730 in the form of a program. The CPU 710 reads out the program from the auxiliary storage device 730, loads it on the primary storage device 720, and executes the operation of each unit according to the program.

Acceptance of ciphertext input and tag input performed by the ciphertext input unit 200 is executed by the interface 740 having, for example, a communication function or an input function such as a user operation accepting function, and performing an input process under the control of the CPU 710.

Output of cleartext or error messages performed by the cleartext output unit 207 is executed by the interface 740 having, for example, a communication function or an output function such as a displaying function, and performing an output process under the control of the CPU 710.

In the case where the authentication decryption device 20c is implemented in the computer 700, operations of the initialization vector input unit 201, the mask generation unit 202c, the decryption unit 203c, the second calculation unit 204, the third encryption unit 205c, and the tag inspection unit 206 are stored in the auxiliary storage device 730 in the form of a program. The CPU 710 reads out the program from the auxiliary storage device 730, loads it on the primary storage device 720, and executes the operation of each unit according to the program.

Acceptance of ciphertext input and tag input performed by the ciphertext input unit 200 is executed by the interface 740 having, for example, a communication function or an input function such as a user operation accepting function, and performing an input process under the control of the CPU 710.

Output of cleartext or error messages performed by the cleartext output unit 207 is executed by the interface 740 having, for example, a communication function or an output function such as a displaying function, and performing an output process under the control of the CPU 710.

In the case where the authentication decryption device 40 is implemented in the computer 700, operations of the initialization vector input unit 401, the mask generation unit 402, the decryption unit 403, the second calculation unit 404, the third encryption unit 405, and the tag inspection unit 406 are stored in the auxiliary storage device 730 in the form of a program. The CPU 710 reads out the program from the auxiliary storage device 730, loads it on the primary storage device 720, and executes the operation of each unit according to the program.

Acceptance of ciphertext input and tag input performed by the ciphertext input unit 400 is executed by the interface 740 having, for example, a communication function or an input function such as a user operation accepting function, and performing an input process under the control of the CPU 710.

Output of cleartext or error messages performed by the cleartext output unit 407 is executed by the interface 740 having, for example, a communication function or an output function such as a displaying function, and performing an output process under the control of the CPU 710.

In the case where the authentication encryption device 50 is implemented in the computer 700, operations of the mask sequence generation unit 501, the tag mask generation unit 502, the first encryption unit 503, the checksum calculation unit 504, and the second encryption unit 505 are stored in the auxiliary storage device 730 in the form of a program. The CPU 710 reads out the program from the auxiliary storage device 730, loads it on the primary storage device 720, and executes the operation of each unit according to the program.

In the case where the authentication decryption device 60 is implemented in the computer 700, operations of the mask sequence generation unit 601, the tag mask generation unit 602, the decryption unit 603, the checksum calculation unit 604, the tag generation unit 605, and the tag inspection unit 606 are stored in the auxiliary storage device 730 in the form of a program. The CPU 710 reads out the program from the auxiliary storage device 730, loads it on the primary storage device 720, and executes the operation of each unit according to the program.

It should be noted that a program for realizing all or part of the functions of the authentication encryption devices 10, 10b, 10c, 30, and 50, and the authentication decryption devices 20, 20b, 20c, 40, and 60 may be recorded on a computer-readable recording medium, and the program recorded on the recording medium may be read into and executed on a computer system, to thereby perform the processing of each unit. The "computer system" referred to here includes an OS (operating system) and hardware such as peripheral devices.

Moreover, the "computer-readable recording medium" referred to here refers to a portable medium such as a flexible disk, a magnetic optical disk, a ROM (Read Only Memory), and a CD-ROM (Compact Disc Read Only Memory), or a memory storage device such as a hard disk built in a computer system. The above program may be a program for realizing a part of the functions described above, and may be a program capable of realizing the functions described above in combination with a program already recorded in a computer system.

The example embodiments of the present invention have been described in detail with reference to the drawings. However, the specific configuration of the invention is not limited to the example embodiments, and may include design changes and so forth that do not depart from the scope of the present invention.

INDUSTRIAL APPLICABILITY

The example embodiments of the present invention may be applied to an authentication encryption device, an authentication decryption device, an authentication encryption method, an authentication decryption method, and a recording medium.

DESCRIPTION OF REFERENCE SYMBOLS 10, 10b, 10c, 30 Authentication encryption device
100, 300 Cleartext input unit
101, 301 Initialization vector generation unit
102, 102b, 102c, 302 Mask generation unit
103, 103b, 103c, 303 First encryption unit
104, 304 First calculation unit
105, 105b, 105c, 305 Second encryption unit
106, 306 Ciphertext output unit
20, 20b, 20c, 40 Authentication decryption device
200, 400 Ciphertext input unit
201, 401 Initialization vector input unit
202, 202b, 202c, 402 Mask generation unit
203, 203b, 203c, 403 Decryption unit
204, 404 Second calculation unit
205, 205b, 205c, 405 Third encryption unit
206, 406 Tag inspection unit
207, 407 Cleartext output unit

What is claimed is:

1. An authentication encryption device comprising:
at least one memory configured to execute instructions; and
at least one processor configured to execute the instructions to:
generate a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block;
generate a mask for tag generation by multiplication, in the Galois field, of the basic mask and the primitive element of the multiplicative group of the Galois field raised to power of an exponent differing from the exponent in any of the element in the mask sequence;

encrypt, at each of primitive inputting and outputting, cleartext using a tweakable block cipher for computing exclusive OR for which the element in the mask sequence used;

calculate a checksum of the cleartext using the cleartext block; and encrypt, at at least inputting among primitive inputting and outputting, the checksum using a tweakable block cipher for computing exclusive OR for which the mask for tag generation is used and generate a tag for authentication.

2. The authentication encryption device according to claim 1, wherein the at least one processor is configured to execute the instructions to:

generate the mask sequence, using a basic mask based on: a block cipher that uses the secret key; and the initialization vector;

generate the mask for tag generation, using the basic mask;

encrypt the cleartext block, using the block cipher that uses the secret key as the primitive; and generate the tag, using the block cipher that uses the secret key as the primitive.

3. The authentication encryption device according to claim 1, wherein the at least one processor is configured to execute the instructions to:

generate the mask sequence, using a basic mask obtained by taking an exclusive OR of a keyless cryptographic permutation of a combination of the secret key and the initialization vector and the combination of the secret key and the initialization vector;

generate the mask for tag generation, using the basic mask;

encrypt the cleartext block, using the keyless cryptographic permutation as the primitive; and generate the tag, using the keyless cryptographic permutation as the primitive.

4. The authentication encryption device according to claim 1, wherein the at least one processor is configured to execute the instructions to calculate a checksum by means of an exclusive OR of each cleartext block and each element of the mask sequence.

5. An authentication decryption device comprising:

at least one memory configured to execute instructions; and at least one processor configured to execute the instructions to:

generate a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block;

generate a mask for tag generation by multiplication, in the Galois field, of the basic mask and the primitive element of the multiplicative group of the Galois field raised to power of an exponent differing from the exponent in any of the element in the mask sequence;

decrypt, at each of decryption function inputting and outputting, a cipher block into a cleartext block, using a tweakable block cipher for computing exclusive OR for which the element in the mask sequence is used;

calculate a checksum of cleartext, using the cleartext block;

encrypt, at at least inputting among encryption function inputting and outputting, the checksum using a tweakable block cipher for computing exclusive OR for which the mask for tag generation is used, and generates a tag for authentication, the encryption function being a reciprocal function of the decryption function; and decide whether to accept or not to accept a result of decryption, by using the tag.

6. An authentication encryption method comprising:

generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block;

generating a mask for tag generation by multiplication, in the Galois field, of the basic mask and the primitive element of the multiplicative group of the Galois field raised to power of an exponent differing from the exponent in any of the element in the mask sequence;

encrypting, at each of primitive inputting and outputting, cleartext using a tweakable block cipher for computing exclusive OR for which the element in the mask sequence used;

calculating a checksum of the cleartext using the cleartext block; and encrypting, at at least inputting among primitive inputting and outputting, the checksum using a tweakable block cipher for computing exclusive OR for which the mask for tag generation is used and generating a tag for authentication.

7. An authentication decryption method comprising:

generating a mask sequence having, as an element, multiplication, in a Galois field, of a basic mask and a primitive element raised to power of an exponent, the basic mask being defined based on an initialization vector, a secret key, and a constant, the primitive element being a primitive element of a multiplicative group of the Galois field, the exponent differing per cleartext block;

generating a mask for tag generation by multiplication, in the Galois field, of the basic mask and the primitive element of the multiplicative group of the Galois field raised to power of an exponent differing from the exponent in any of the element in the mask sequence;

decrypting, at each of decryption function inputting and outputting, a cipher block into a cleartext block, using a tweakable block cipher for computing exclusive OR for which the element in the mask sequence is used;

calculating a checksum of cleartext, using the cleartext block;

encrypting, at at least inputting among encryption function inputting and outputting, the checksum using a tweakable block cipher for computing exclusive OR for which the mask for tag generation is used, and generating a tag for authentication, the encryption function being a reciprocal function of the decryption function; and deciding whether to accept or not to accept a result of decryption, by using the tag.

* * * * *